(12) United States Patent
Sampath et al.

(10) Patent No.: US 8,665,739 B2
(45) Date of Patent: Mar. 4, 2014

(54) PACKET LOSS MEASUREMENT AT SERVICE ENDPOINTS OF A VIRTUAL PRIVATE LAN SERVICE

(75) Inventors: Prabakaran Thirumali Sampath, San Jose, CA (US); Sri Goli, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 207 days.

(21) Appl. No.: 13/049,676

(22) Filed: Mar. 16, 2011

(65) Prior Publication Data
US 2012/0236734 A1    Sep. 20, 2012

(51) Int. Cl.
| | |
|---|---|
| H04W 4/00 | (2009.01) |
| H04L 12/28 | (2006.01) |
| H04J 1/14 | (2006.01) |
| H04L 12/26 | (2006.01) |
| H04J 3/24 | (2006.01) |

(52) U.S. Cl.
USPC ........... 370/252; 370/332; 370/496; 370/413; 370/473; 370/351; 370/389; 370/250; 370/401

(58) Field of Classification Search
USPC ......... 370/250, 252, 332, 351, 389, 413, 473, 370/496; 707/101; 711/3
See application file for complete search history.

(56) References Cited

U.S. PATENT DOCUMENTS

| | | | | |
|---|---|---|---|---|
| 7,606,203 | B1 * | 10/2009 | Shabtay et al. | ............... 370/332 |
| 2006/0002370 | A1 * | 1/2006 | Rabie et al. | ................... 370/351 |
| 2006/0285500 | A1 * | 12/2006 | Booth et al. | .................. 370/250 |
| 2007/0038798 | A1 * | 2/2007 | Bouchard et al. | ................. 711/3 |
| 2007/0263535 | A1 | 11/2007 | Shabtay | |
| 2012/0076013 | A1 * | 3/2012 | Cheng | ........................... 370/252 |

OTHER PUBLICATIONS

ITU-T Y.1731: "OAM functions and mechanisms for Ethernet based networks," May 2006, 80 pp.
Zimmerman, "OSI Reference Model—The ISO Model of Architecture for Open Systems Interconnection," IEEE Transaction on Communications, vol. 28, No. 4, Apr. 1980, pp. 425-432.
Bryant et al., RFC 3985, "Pseudo Wire Emulation Edge-to-Edge (PWE3) Architecture," Mar. 2005, 40 pp.
Lasserre et al., RFC 4762, "Virtual Private LAN Service (VPLS) Using Label Distribution Protocol (LDP) Signaling," Jan. 2007, 32 pp.

(Continued)

*Primary Examiner* — Jung Park
*Assistant Examiner* — Chuong M Nguyen
(74) *Attorney, Agent, or Firm* — Shumaker & Sieffert, P.A.

(57) ABSTRACT

In general, techniques are described for measuring packet data unit (PDU) loss in a L2 virtual private network (L2VPN) service, such as a VPLS instance. In one example of the techniques, provider edge (PE) routers that participate in the L2VPN measure known unicast and multicast PDU traffic at the service endpoints for the instance to determine unicast PDU loss within the service provider network. As the routers learn the outbound service (i.e., core-facing) interfaces and outbound local (i.e., customer-facing) interfaces for L2 addresses of customer devices that issue packets to the VPLS instance, the routers establish respective unicast transmit and receipt counters for the service endpoints that serve the customer devices. In another example, PE routers that participate in the L2VPN measure multicast PDU traffic at the service endpoints for the instance and account for internal replication by intermediate service nodes to determine multicast PDU loss within the service.

34 Claims, 12 Drawing Sheets

(56) References Cited

OTHER PUBLICATIONS

Harrington et al., "An Architecture for Describing Simple Network Management Protocol (SNMP) Management Frameworks," RFC 3411, Dec. 2002, 65 pp.
U.S. Appl. No. 12/266,298, by Kaushik Ghosh, filed Nov. 6, 2008.
U.S. Appl. No. 12/195,686, filed Aug. 21, 2008.
U.S. Appl. No. 13/042,059, by Prabakaran Thirumali Sampath, filed Mar. 17, 2011.
European Search Report from European application No. EP 12158636.6-2416, dated Jun. 22, 2012, 10 pp.
Jeong-Dong Ryoo et al., "OAM and its performance monitoring mechanisms for carrier ethernet transport networks," IEEE Communications Magazine, IEEE Service Center Piscatawy, US, vol. 46 No. 3, Mar. 1, 2008, 7 pp.
Response to Office Action dated Dec. 31, 2012, from U.S. Appl. No. 13/042,059, filed Apr. 10, 2013, 27 pp.
Office Action from U.S. Appl. No. 13/042,059, dated Dec. 31, 2012, 30 pp.
Response to the extended European Search Report from European application No. EP 12158636.6-2416, filed Mar. 15, 2013, 3 pp.
Final Office Action from U.S. Appl. No. 13/042,059, dated Jun. 27, 2013, 30 pp.
Response to Office Action dated Jun. 27, 2013, from U.S. Appl. No. 131042,059, filed Oct. 28, 2013, 18 pp.

* cited by examiner

300 ⬊

| LM DOMAIN | ENTRANCE REPLICATION FACTOR | EXIT REPLICATION FACTOR | |
|---|---|---|---|
| 14 | 2 | 4 | —302A |
| 6 | 5 | 2 | —302B |
| 9 | 1 | 1 | —302C |

| SEID | TX | RX | |
|---|---|---|---|
| $CE\_40B_1$ | 200 | 100 | —312A |
| $CE\_40C_1$ | 15 | 12 | —312B |

314 ⬊

| SEID | TX | RX | |
|---|---|---|---|
| $CE\_40A$ | 100 | 200 | —316A |
| $CE\_40C_1$ | 12 | 14 | —316B |

FIG. 10

PACKET LOSS MEASUREMENT AT SERVICE ENDPOINTS OF A VIRTUAL PRIVATE LAN SERVICE

TECHNICAL FIELD

The invention relates to computer networks and, more specifically, to monitoring computer network performance.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Network service providers that offer L2 connectively typically enter into a service-level agreement (SLA) with their customers that defines both the services that are to be provided and a promised level of performance for the services. The performance level specifies measurable metrics such as bandwidth guarantees, up-time percentages, and the number of serviceable users. Another metric commonly defined in an SLA is frame loss performance, which is typically expressed as a ratio of the number of service frames (e.g., encapsulated L2 communications) not delivered to the total number of service frames during a particular time interval.

To monitor L2 performance metrics and verify operation, network administrators implement a process referred to as Operations, Administration and Maintenance (OAM), which generally provides the activities, tools, standards and other techniques that involve operating, administering and maintaining connectivity in the L2 computer network. One such OAM tool, referred to as OAM Frame Loss Measurement, standardizes mechanisms for loss measurement in an Ethernet computer network and is described in the Internal Telecommunication Union Telecommunication Standardization Section (ITU-T) recommendation Y.1731, "OAM functions and mechanisms for Ethernet based networks," May, 2006, which is incorporated by reference herein in its entirety. OAM Frame Loss Measurement as described in ITU-T Y.1731, Section 8, defines the Frame Loss Ratio performance metric to apply to Ethernet frames admitted at the ingress L2 flow point of an L2 connection and delivered to the egress L2 flow point of the L2 connection.

SUMMARY

In general, techniques are described for measuring packet data unit (PDU) loss in a L2 virtual private network (L2VPN) that interconnects two or more L2 customer networks. The techniques may be useful for network service providers offering systems that provide L2 connectivity between multiple, geographically separate L2 customer networks. That is, separate L2 customer networks (or "customer network sites") may be interconnected by the service provider to provide L2 connectivity as though the customer network sites were directly connected. One mechanism by which network service providers provide L2 connectivity to their customers is by use of a virtual private local area network service (VPLS). A customer-specific VPLS instance transports layer two (L2) communications, such as Ethernet packets, between customer network sites through the service provider network core. In a typical configuration, provide edge (PE) routers coupled to the customer network sites define label switched paths (LSPs) that may be used to carry pseudowires that carry encapsulated L2 communications within the provider network as if the customer network sites were directly attached to the same local area network (LAN). Each of the PE routers then operates as a virtual L2 switch having customer- and core-facing interfaces to connect the multiple LAN segments of an overall customer network defined by the individual customer network sites. In some instances, a service provider network implements a hierarchical VPLS, or H-VPLS, to eliminate the requirement of a full mesh of service links to connect each pair of PE routers. In these instances, a particular pseudowire may carry PDUs switched by any number of PE routers.

For a VPLS or H-VPLS instance connecting customer network sites for a customer, the PE routers measure known unicast and multicast PDU traffic at the service endpoints for the instance to measure PDU loss within the service provider network. As a router learns the outbound service (i.e., core-facing) interfaces and outbound local (i.e., customer-facing) interfaces for L2 addresses of customer devices that issue packets to the VPLS or H-VPLS instance, unicast PDUs that include destination L2 addresses for which the outbound interfaces are learned become "known" unicast PDUs in that the router has information mapping the outbound forwarding interface to the destination L2 addresses for the respective unicast PDUs, and the router establishes respective transmit and receipt counters for the service endpoints that serve the customer devices. For example, when a PE router receives a PDU having a source L2 address on a service interface, the router installs the source L2 address-service interface mapping to the VPLS instance forwarding table, in accordance with L2 address learning techniques, and additionally establishes transmit and receipt counters. The PE router then associates these counters with a service endpoint identifier for the service endpoint that offers ingress L2 connectivity to the source L2 address. The service endpoint identifier may refer, for instance, to a virtual switch instance identifier, a PE router network address or other identifier, or to one or more L2 addresses of customer devices served by a service endpoint. Thereafter, when the PE router transmits or receives on the service interface a PDU labeled with a service endpoint identifier, the router increments the appropriate transmit or receipt counter.

To determine PDU loss between two service endpoints that offer L2 connectivity to a pair of customer networks, PE routers exchange transmit and receipt counter values for service endpoint identifiers and compute differences between PDUs received at egress service endpoints and PDUs transmitted at ingress service endpoints. For instance, a first PE router that comprises an ingress service endpoint for a VPLS or H-VPLS instance may query a second router that comprises the egress service endpoint with the ingress service endpoint identifier to obtain transmit and receipt counter values associated by the second PE router to the ingress service endpoint identifier. Upon receiving these remote service endpoint counter values, the first PE router determines local transmit and receipt counter values associated by the first PE router to the egress service endpoint identifier and computes bidirectional PDU losses between the two service endpoints as differences between the remote and local counter values.

To perform loss measurement techniques with respect to broadcast and multicast L2 traffic, the PE routers may additionally establish separate transmit and receipt counters for broadcast/multicast (hereinafter, all L2 broadcast and multicast traffic is referred to as multicast traffic) PDUs replicated by the routers to multiple service interfaces of a VPLS or H-VPLS instance. As the PE routers transmit or receive on service interfaces a multicast PDU labeled with a service endpoint identifier, the router increments the appropriate transmit or receipt counter. To determine multicast/broadcast PDU loss over the service provider network, PE routers that comprise egress service endpoints for a particular flow of multicast PDUs may divide their respective receipt counter values for the PDUs by a replication factor that represents a number of PDU replicates received at the egress service endpoints along a particular branch of the VPLS or H-VPLS replication tree. The egress PE routers send the factored receipt counter values to the ingress PE router for the flow, which correlates the factored receipt counter values to the transmit counter value for the flow by computing a difference between the sum of the factored receipt counter values and the transmit counter value.

The PE routers may additionally establish one or more loss measurement domains for a VPLS or H-VPLS instance to, for instance, constrain application of loss measurement techniques to PE routers capable of performing such techniques. The PE routers exchange a unique value that identifies a loss measurement domain. As the routers learn L2 addresses for customer devices in the loss measurement domain using L2-learning techniques, the routers add a shim header to transmitted service packets that includes the loss measurement domain identifier. By examining the shim header, routers track the number of PDUs transmitted or received by the service interfaces in the loss measurement domain according to the L2 address. For example, an ingress router for a customer device receives a PDU destined for a remote customer device in a remote network, adds a shim header that includes the loss measurement domain identifier, increments a transmit counter behind the loss measurement domain for the remote customer device L2 address, and delivers the service packet to the appropriate service interface. An egress router for a customer device receives, at a service interface, a service packet that includes a shim header having a loss measurement domain identifier, increments a receipt counter behind the identified loss measurement domain for the source L2 address of the delivered PDU. In this way, the routers maintain PDU counters for customer network L2 addresses according to an identified loss measurement domain.

In the case of multicast traffic, each PE router comprises a service endpoint for such traffic, and the loss measurement domain identifier may therefore operate as a service endpoint identifier. Each PE router capable of performing the loss measurement techniques establishes transmit and/or receipt counters for a particular multicast flow issuing from a particular customer device having a source L2 address behind the loss measurement domain identified by the loss measurement domain identifier in the shim header. Upon transmitting or receiving multicast PDUs encapsulated with the shim header at service endpoints, the PE routers increment the appropriate transmit or receipt counter for the source L2 address behind the identified loss measurement domain. Service provider network routers that may replicate multicast PDUs along multiple pseudowires store a table that maps the loss measurement domain identifier to a replication factor at the respective router. For example, for a VPLS instance, an ingress PE router maps a number of pseudowires for the instance connected to the ingress PE router to a loss measurement domain identifier in the table. For an H-VPLS instance, hub routers maps a number of pseudowires connected to the hub entry point and a number of spokes connected to each of the hub exit points to the loss measurement domain identifier. To obtain the one or more replication factors at the PE routers that comprise the egress service endpoints, the PE router that comprises the ingress service endpoint issues a multicast loss measurement message over the VPLS or H-VPLS instance that specifies the loss measurement domain identifier. As the multicast loss measurement message traverses the service provider network, routers add their respective mapped replication factors for the loss measurement domain identifier to the message. When the replicated, multicast loss measurement message reach individual PE routers that comprise the egress service endpoints, the messages include sufficient replication factor information with which to compute replication factors for the egress service endpoints. The egress PE routers divide their respective receipt counter values for the PDUs by the replication factor and send the factored receipt counter values to the ingress PE router that issued the loss measurement message, which correlates the factored receipt counter values to the transmit counter value for the multicast flow by computing a difference between the sum of the factored receipt counter values and the transmit counter value.

Applying the described techniques may improve loss measurement accuracy for VPLS and H-VPLS instances by actively correlating known unicast service traffic at service endpoints using service endpoint identifiers and by maintaining separate unicast and multicast counters for the service endpoints. The techniques may therefore reduce inaccuracies introduced by replicated unknown unicast traffic. Moreover, by accounting for replication factors at the egress service endpoints of an L2 multicast flow, the techniques may enable multicast loss measurement. Loss measurement results for the service may be used to calculate PDU loss ratios between service endpoint pairs or to provide an overall PDU loss ratio for the VPLS or H-VPLS instance. These more accurate loss measurements for the service may improve the ability of the service provider to verify to customers that operation of the service meets the performance requirements of an SLA, for instance.

In one embodiment, the invention is directed to a method comprising switching layer two (L2) packet data units (PDUs) with a local network device between a local L2 network, coupled by an attachment circuit for a Virtual Private Local Area Network (LAN) Service (VPLS) instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to one or more corresponding remote network devices that each serves a corresponding one of the remote L2 networks. The method further comprises incrementing, with the local network device, a respective unicast receipt counter for each of one or more remote service endpoints of the VPLS instance only for the PDUs that are known unicast PDUs within the respective remote network device of the corresponding remote service endpoint from which the PDU was received, wherein each of the known unicast PDUs received by the local network device is a unicast PDU that includes an indicator that the remote network device from which the unicast PDU was received currently maps the destination L2 address of the unicast PDU to a corresponding outbound interface of the remote network device.

In another embodiment, the invention is directed to a method comprising switching layer two (L2) packet data units (PDUs) with a local network device between a local L2 network, coupled by an attachment circuit for a Virtual Private Local Area Network (LAN) Service (VPLS) instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to one or more corresponding remote network devices that each serves a corresponding one of the remote L2 networks. The method also comprises incrementing, with the local network device, a multicast PDU transmit counter for each multicast PDU or broadcast PDU received from the attachment circuit and switched by the local network device to the one or more remote network devices. The method further comprises receiving, with the local network device, a respective multicast PDU receipt return value from each of the one or more remote network devices. The method further comprises determining, with the local network device, multicast PDU loss measurement data based at least on a multicast PDU transmit counter value and the multicast PDU receipt return values, and sending the multicast PDU loss measurement data from the local network device to a management entity.

In another embodiment, the invention is directed to a network device comprising a control unit having one or more processors, and one or more interface cards. The network device also comprises a Virtual Private Local Area Network (LAN) Service (VPLS) layer of the control unit that switches layer two (L2) packet data units (PDUs) between a local L2 network, coupled by an attachment circuit for a VPLS instance to one of the interface cards, and one or more remote L2 networks to provide the VPLS instance to the local and remote L2 networks, wherein the network device terminates one or more pseudowires that operate over a layer three (L3) packet-switched network (PSN) to carry the PDUs in pseudowire packets to connect, for the VPLS instance, the network device to one or more corresponding remote network devices that each serves a corresponding one of the remote L2 networks. The network device further comprises an accounting module of the control unit that increments a respective unicast transmit counter for each of one or more remote service endpoints of the VPLS instance only for the PDUs that are known unicast PDUs within the VPLS layer that the network device sends to the corresponding remote service endpoints from which the PDU was received, wherein each of the known unicast PDUs received by the local network device is a unicast PDU that includes an indicator that the remote network device from which the unicast PDU was received currently maps the destination L2 address of the unicast PDU to a corresponding outbound interface of the remote network device.

In another embodiment, the invention is directed to a network device comprising a control unit having one or more processors, and one or more interface cards. The network device further comprises a Virtual Private Local Area Network (LAN) Service (VPLS) layer of the control unit to switch layer two (L2) packet data units (PDUs) between a local L2 network, coupled by an attachment circuit for a VPLS instance to one of the interface cards, and one or more remote L2 networks to provide the VPLS instance to the local and remote L2 networks, wherein the network device terminates one or more pseudowires that operate over a layer three (L3) packet-switched network (PSN) to carry the PDUs in pseudowire packets to connect, for the VPLS instance, the network device to one or more corresponding remote network devices that each serves a corresponding one of the remote L2 networks. The network device also comprises an accounting module of the control unit that increments a multicast PDU transmit counter for each multicast PDU or broadcast PDU received from the attachment circuit and switched by the VPLS layer to the one or more remote network devices. The network device further comprises a loss measurement message handler that receives a multicast PDU receipt return value from each of the one or more remote network devices, wherein the accounting module determines multicast PDU loss measurement data based at least on a multicast PDU transmit counter value and the respective multicast PDU receipt return values. The network device also comprises a management interface that sends the multicast PDU loss measurement data to a management entity.

In another embodiment, the invention is directed to a system comprising a network management system, a local network device, and one or more remote network devices that participate in a Virtual Private Local Area Network (LAN) Service (VPLS) instance to switch layer two (L2) packet data units (PDUs) between a local L2 network, coupled by an attachment circuit for a VPLS instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to the one or more corresponding remote network devices that each serves a corresponding one of the remote L2 networks, wherein the local network device increments a multicast PDU transmit counter for each multicast PDU or broadcast PDU received from the attachment circuit and switched by the local network device to the one or more remote network devices, wherein each of the one or more remote network devices increment a respective multicast PDU receipt counter for the local network device for each multicast PDU or broadcast PDU received from the local network device, wherein the local network device issues a multicast loss measurement message from the local network device to the one or more remote network devices, wherein each of the one or more remote network devices returns a respective return value based at least on a respective multicast PDU receive counter value for the local network device, wherein the local network device receives the return values from the one or more remote network devices and computes multicast PDU loss measurement data based at least on the return values and a multicast PDU transmit counter value, and wherein the local network device sends the multicast PDU loss measurement data to the network management system.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a block diagram illustrating a replication factor table.

FIG. 10 is a block diagram illustrating example local endpoint unicast PDU counters and remote endpoint unicast PDU counters comprised by separate network devices that implement the techniques of this disclosure.

DETAILED DESCRIPTION

Figure 1:
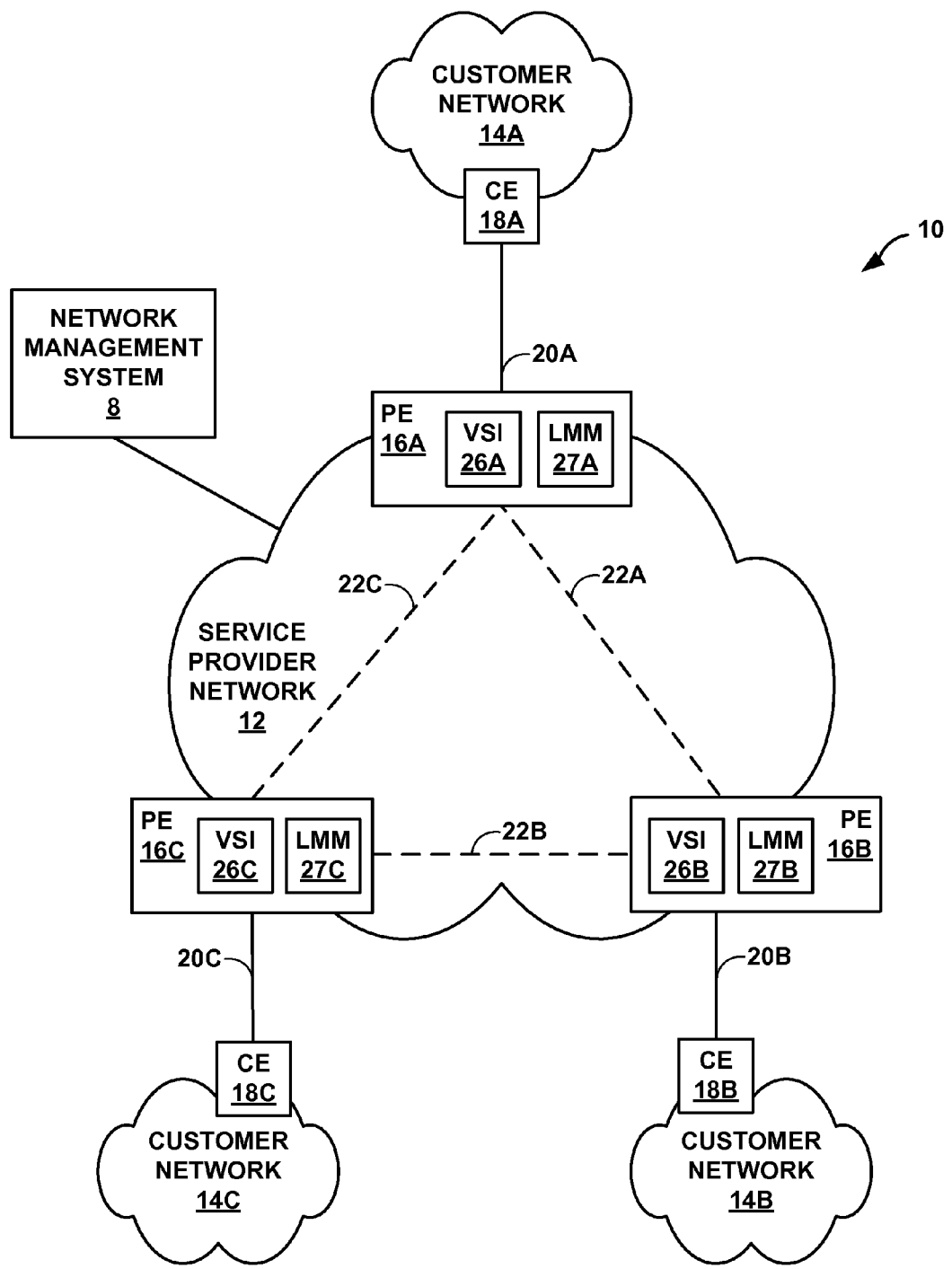
FIG. 1 is a block diagram illustrating an example network system in which one or more network devices monitor emulated service traffic at service endpoints and determine packet data loss according to the techniques described herein.

FIG. 1 is a block diagram illustrating an example network system 10 in which one or more network devices monitor emulated service traffic at service endpoints and determine packet data loss according to the techniques described herein. As shown in FIG. 1, network system 10 includes a network 12 and customer networks 14A-14C ("customer networks 14"). Network 12 may represent a public network that is owned and operated by a service provider to interconnect a plurality of edge networks, such as customer networks 14. As a result, network 12 may be referred to herein as a Service Provider (SP) network or, alternatively, as a "core network" in that network 12 acts as a core to interconnect access networks that service customer networks 14. Example service providers include Verizon Communications, Inc. or American Telephone & Telegraph (AT&T™) Company.

These service providers may lease portions of network 12 or provide switching (or bridging) services offering interconnection through network 12 to customer networks 14, which may lease the portions or purchase the services provided by network 12 to create a Layer 2 Virtual Private Network (L2VPN) interconnecting the various layer 2 (L2) customer networks 14. The bridging service may be, for example, an L2VPN, a Virtual Private Local Area Network (LAN) Service (VPLS), or a virtual leased line (VLL). Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein.

In the illustrated instance, network 12 provides a type of L2VPN, a VPLS in this example, to transparently interconnect these layer 2 networks, e.g., customer networks 14, to one another via service provider network 12. Network 12 may provide a VPLS instance to a customer by transparently emulating a direct connection between these various customer networks 14 such that, from the perspective of customer networks 14, each of customer networks 14 appears to directly connect to one another. Moreover, different VPLS instances, including corresponding virtual routing and forwarding information (VRFs), may be maintained by routers within network 12.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to provide a service offered by service provider network 12, such as the VPLS instance, in order to transparently interconnect these networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of customer networks 14 may comprise a Virtual Private Network (VPN), a Large Area Network (LAN), or a Wide Area Network (WAN). Although not shown in FIG. 1 for ease of illustration purposes, each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 may include a plurality of provider edge (PE) routers 16A-16C ("PEs 16") that reside at an edge of service provider network 12. While discussed herein with respect to a particular network device, i.e., a router, PEs 16 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality.

Each of customer networks 14 may also include a respective one of a plurality of customer edge (CE) routers 18A-18C ("CEs 18") that reside at an edge of the corresponding one of customer networks 14. Like PEs 16, CEs 18, while discussed herein with respect to a particular network device, i.e., a router, may each represent any network device that interfaces with a network, such as service provider network 12, to bridge, switch or otherwise forward network traffic directed to or originating from the network. For example, CEs 18 may each represent, in certain instances, one or more of a switch, a hub, a bridge device (e.g., an Ethernet bridge), or any other L2 network device and, in some instances, L3 network devices capable of performing L2 functionality.

PEs 16 couple to respective CEs 18 of customer networks 14 via attachment circuits 20A-20C ("ACs 20"). Each of ACs 20 is a physical or virtual circuit attaching a CEs 18 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each comprise a direct link or an access network.

PEs 16 may provide one or more services, such as the above described VPLS instance, to transparently interconnect CEs 18 to one another. To continue the above example, the large entity may own and operate each of customer networks 14 and purchase from the service provider a VPLS instance to transparently interconnect each of these CEs 18 to one another via service provider network 12. In this case, PE 16A may emulate a direct connection in accordance with the VPLS instance to both of CEs 18B, 18C such that these CE routers may operate as if both directly connected to CE 18A. Likewise, PE 16B may emulate a direct connection in accordance with the VPLS instance to both of CEs 18A, 18C such that these customer network may operate as if both directly connected to CE 18B. In some instances, one or more of CEs 18 may comprise or otherwise operate as a L2 bridge between associated customer networks 14 and connected PEs 16. In such instances, the VPLS instance "learns" multiple source L2 addresses of additional devices within the customer networks 14 from the bridging CEs 18. The techniques described herein may apply with respect to these multiple source L2 addresses in addition to, or instead of, to the learned source L2 addresses of CEs 18.

This form of interconnection is referred to as "full mesh" in that a VPLS provides logical point-to-point connectivity between each of a set of CEs 18 and associated customer networks 14. The full mesh form of interconnection is illustrated in FIG. 1 as three bi-directional service links 22A-22C ("service links 22") that transport customer L2 PDUs between PEs 16. Service links 22 are illustrated in FIG. 1 as dashed lines to reflect that these may not directly couple PEs 16 to one another with a single physical link, but may transport PDUs over one or more physical links and intermediate network devices that form each of service links 22. While assumed for ease of illustration purposes to be configured in this full mesh manner, CEs 18 may interconnect with one another via any other form of interconnection, and service links 22 may be bi-directional or unidirectional to suit any particular form of interconnection. Each of service links 22 may be implemented as a pseudowire. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein.

Each of service links 22 may operate over a packet-switched network (PSN) tunnel that connects respective service link endpoint PEs 16. For example, customer L2 traffic encapsulated for transport along service link 22A in service packets may be further encapsulated for transport in a transport tunnel established between PEs 16A, 16B. While generally described in this document as an LSP, transport tunnels may also include GRE, L2TP, and IPsec tunnels, for example. A particular PSN tunnel may deliver service packets for multiple service links for different VPLS instances, including any of service links 22.

An administrator of service provider network 12 may configure or PEs 16 may cooperatively establish service links 22 for the VPLS instance, and once established, PEs 16 begin emulating the direct connection between customer networks 14 using service links 22, thus implementing an emulated service that terminates at the customer edges. Each of PEs 16 for each of the service links 22 endpoints is configured with the particular pseudowire label that identifies received service packets for the VPLS instance in the data plane, as well as with the particular pseudowire label that the PE is to attach to service traffic to specify the service traffic for the VPLS instance to the data plane of the receiving PE. For example, PE 16A may be configured to attach pseudowire label "100" to specify service link 22A traffic over a PSN tunnel to PE 16B. PE 16A may be further configured with pseudowire label "200" that, when attached to service packets received in a PSN tunnel from PE 16B, identifies the traffic as service link 22A traffic.

Each of PEs 16 includes a respective one of virtual switch instances 26A-26C (illustrated as "VSIs 26") that connects attachment circuits 20 and service links 22 for the VPLS instance at PEs 16. VSIs 26 may in the alternative be referred to as virtual bridges. Each of VSIs 26 includes an L2 forwarding table for the VPLS instance that maps learned destination L2 addresses of customer devices to one or more attachment circuits 20 or service links 22. CEs 18 forward L2 traffic via respective ACs 20 to corresponding PEs 16, which attach the appropriate pseudowire label to the L2 traffic to generate service packets and forward the service packets through service provider network 12 via selected ones of service links 22 in accordance with corresponding one of VSIs 26 for the VPLS instance. Receiving PEs 16 identify the corresponding one of VSIs 26 of the receiving PEs using the attached pseudowire labels and, in accordance with the identified VSI, transparently deliver the L2 traffic via ACs 20 to the other ones of customer networks 14. In this manner, a large entity may use a VPLS instance of service provider network 12 to interconnect disparate and often geographically separate customer networks 14. In some instances, network system 10 may include additional customer networks 14 and corresponding CEs 18 for which service provider network 12 provides one or more VPLS instances to interconnect the CEs 18 in various combinations. Each VPLS instance requires a distinct mesh of service links (e.g., a full mesh of pseudowires interconnecting participating PEs 16).

Service links 22 terminate at logical ports within PEs 16 that couple attachment circuits 20 to service links 22 in VSIs 26 and are referred to herein as "service endpoints" for the VPLS instance. Service endpoints that receive L2 traffic from attachment circuits 20 are ingress service endpoints, while service endpoints that output L2 traffic to attachment circuits 20 are egress service endpoints. A service endpoint, in other words, is a logical port comprised by one of PEs 16 that connects one of attachment circuits 20 to one or more service links 22. Two service endpoints comprised by different ones of PEs 16 may transparently connect two attachment circuits 20 and thereby emulate a port-to-port or port-to-multiport L2 service (e.g., Ethernet). However, service endpoints may in some contexts be understood as extending over respective attachment circuits 20 to corresponding customer networks 14.

L2 traffic may include broadcast, unknown unicast, or multicast (i.e, "BUM") traffic that is replicated by the corresponding one of VSIs 26 for the ingress one of PEs 22 and sent over multiple service links 22 to multiple egress PEs 16. For example, CE 18A may forward BUM L2 traffic via attachment circuit 20A to PE 16A, which VSI 26A replicates and forwards via service links 22A, 22C to respective PEs 16B, 16C for delivery to respective customer networks 14B, 14C and interested devices therein. In general, broadcast and multicast traffic includes traffic delivered by a L2 network to multiple interested recipients, while unknown unicast traffic is unicast traffic with one interested recipient for which the L2 network location is unknown and that is therefore broadcast by the L2 network to attempt to reach the interested recipient. L2 traffic additionally includes known unicast traffic for which outbound interfaces are set within the L2 forwarding table of one or more VSIs 26A. An outbound interface may include a VPLS core-facing interface, such as one of service links 22, or a local interface, such as one of attachment circuits 20.

In accordance with the described techniques, each of PEs 16 comprises a respective one of loss measurement modules 27A-27C (illustrated as "LMMs 27") that establishes transmit and receipt counters for service endpoints and tracks L2 traffic at the service endpoints to enable PDU loss measurement within network 12 for VPLS instances. PEs 16 exchange service endpoint identifiers that provide to LMMs 27 a means with which to disambiguate traffic entering the VPLS instance at different service endpoints. The service endpoint identifiers may comprise any value that uniquely identifies a service endpoint within the scope of a VPLS instance. For example, a service endpoint identifier may comprise a network address or other identity of the one PEs 16 that comprises the service identifier, a label, or Virtual LAN (VLAN) tag. PEs 16 may exchange the service endpoint identifiers while establishing a VPLS instance using, for example, Border Gateway Protocol (BGP)- or Label Distribution Protocol (LDP)-based signaling protocols. Additional details regarding establishing a VPLS using BGP are found in "Virtual Private LAN Service (VPLS) Using Border Gateway Protocol (BGP) for Auto-Discovery and Signaling," Request for Comments: 4761, Network Working Group (Kompella and Rekhter, ed.), January 2007, which is incorporated by reference as if fully set forth herein. Additional details regarding establishing a VPLS using LDP are found in "Virtual Private LAN Service (VPLS) Using Label Distribution Protocol (LDP) Signaling," Request for Comments: 4762, Network Working Group (Lasserre and Kompella, ed.), January 2007, which is incorporated by reference as if fully set forth herein. In one example aspect, PEs 16 exchange service endpoint identifiers carried in modified BGP UPDATE messages issued by the PEs. The modified BGP UPDATE messages may carry the service endpoint identifiers in a new Address Family Identifier (AFI) or Subsequent AFI (SAFI) of the Network Layer Reachability Information (NLRI).

In one example, each of LMMs 27 establishes a transmit and receipt counter for each remote service endpoint identifier and additionally stores a service endpoint identifier mapping table that maps learned, remote L2 addresses to service endpoint identifiers for the ingress service endpoints for PDUs originated by the L2 addresses. In some examples, each of LMMs 27 establishes a transmit and receipt counter for each pair of L2 addresses specified in a PDU transmitted or received at the corresponding PE 16. VSIs 26 attach the service endpoint identifier corresponding to the service endpoint comprised by the respective one of PEs 16 to L2 PDUs that VSIs 26 switch from attachment circuits 20 to service links 22. VSIs 26 may attach the service endpoint identifier as a VLAN tag, for example, or as a shim header at the emulated service layer. In this way, a unicast PDU carried by service links 22 to the egress service endpoint includes an indicator that specifies that the remote network device from which the unicast PDU was received currently maps the destination L2 address of the unicast PDU to a corresponding outbound interface of the remote network device. The indicator need not specify the service endpoint identifier; it may simply be an indication to any receiving network device that the PDU is known unicast at the transmitting network device. The indicator may comprise a flag or other value in a header, a shim header, or a VLAN tag, for example. In addition, for both multicast and unicast PDUs carried by service links 22 to the egress service endpoint, each of the PDUs may include an identifier for the ingress service endpoint of the PDU. If a destination L2 address for the PDU has not been learned by the one of VSIs 26 switching the PDU (i.e., the PDU is unknown unicast), the VSI does not attach a service endpoint identifier. Attaching service endpoint identifiers to unknown unicast traffic may prevent correlation of transmit and receipt counter values at opposite service endpoints of the VPLS instance.

For example, VSI 26A may receive a PDU from CE 18A via attachment circuit 20A that is destined for the L2 address of the CE 18C. If the L2 address of CE 18C is unknown (i.e., not in a L2 forwarding table of VSI 26A), VSI 26A switches the PDU as unknown unicast traffic in service packets via service links 22A, 22C to respective PEs 16B, 16C. VSI 26A does not in this case attach a service endpoint identifier for the service endpoint comprised by PE 16A. Upon learning the L2 address of CE 18C by, for example, receiving a PDU sourced by CE 18C on service link 22C, VSI 26A switches PDUs destined for the L2 address of CE 18C only to service link 22C and additionally attaches a service endpoint identifier to the PDUs to by carried by service packets via service link 22C to VSI 26C.

For each service packet that is switched at the ingress service endpoint by one of VSIs 26 and includes an attached service endpoint identifier, the corresponding one of LMMs 27 increments a transmit counter. For instance, the LMMs 27 may increment a transmit counter for the service endpoint identifier mapped to the destination L2 address of the switched PDU in a service endpoint identifier mapping table.

Likewise, when VSIs 26 receive service packets that include encapsulated PDUs from service links 22 at an egress service endpoint, the VSIs determine whether the encapsulated data includes service endpoint identifiers in addition to the encapsulated PDUs. The presence of service endpoint identifiers carried by service packets causes VSIs 26 to filter the service endpoint identifiers to the corresponding one of LMMs 27 for the VSIs. LMMs 27 then increment an appropriate receipt counter for the included service endpoint identifier.

LMMs 27 additionally track and correlate multicast L2 PDUs traversing service endpoints of the VPLS instance implemented by VSIs 26 by accounting, at the egress service endpoints, for replication. Each of LMMs 27 stores a replication factor for the VPLS instance that represents a number of replicated multicast PDUs the LMMs output over service links 22. The replication factor in the illustrated instance at each of LMMs 27 is two. For a standard, generalized VPLS instance, the replication factor is equal to N−1, where N is the number of service endpoints. LMMs 27 may determine a replication factor from VSI 26C using, for example, the number of service links 22 to which the VSI is connected. As another example, LMMs 27 may count a number of multicast PDUs replicated and forwarded by the corresponding VSIs 26 and dynamically update the replication factor using the counted replicates.

Each of LMMs 27 maintains separate transmit counters that the LMM uses to track the number of multicast (as opposed to known unicast) PDUs, sourced by a respective L2 address and received from an associated one of attachment circuits 20 for replicated switching at the corresponding service endpoint via service links 22. Each of LMMs 27 additionally maintains a separate receipt counter for respective source L2 addresses that the LMM uses to the track the number of multicast (as opposed to known unicast) PDUs received from the source L2 addresses. For example, LMM 27B maintains a transmit counter to count the number of multicast PDUs sourced by CE 18B and additionally maintains receipt counters to count the number of multicast PDUs sourced by respective CEs 18A, 18C.

In some instances, as with known unicast traffic, LMMs 27 map multicast transmit and receipt counters to service endpoint identifiers, rather than to source L2 addresses. In such instances, as with known unicast traffic, LMMs 27 attach the service endpoint identifier to PDUs for encapsulation within service packets output over service links 22. Receiving LMMs 27 in these instances count, using the multicast receipt counters, only PDUs received with an attached service endpoint identifier. When VSIs 26 receive service packets that include encapsulated multicast PDUs from service links 22 at an egress service endpoint, the VSIs determine whether the encapsulated data includes service endpoint identifiers in addition to the encapsulated multicast PDUs. The presence of service endpoint identifiers carried by service packets causes VSIs 26 to filter the service endpoint identifiers to the corresponding one of LMMs 27 for the VSIs. LMMs 27 then increment an appropriate receipt counter for the included service endpoint identifier.

In some instances, PEs 16 exchange a loss measurement domain identifier with which each of the PEs may express membership in a loss measurement domain for VPLS instance. A loss measurement domain identifier, unlike a service endpoint identifier, is not unique for each service endpoint but is, rather, shared by each of the LMMs 27 that is a member of the loss measurement domain. PEs 16 may exchange a loss measurement domain identifier while, for example, establishing the VPLS instance using the BGP- or LDP-based signaling techniques described above with respect to service endpoint identifiers. In a standard VPLS instance such as that illustrated in FIG. 1, LMMs 27 increment a replication factor for the VPLS with each loss measurement identifier received from other LMMs. In this way, the replication factor at each of LMMs 27 accounts only for the LMMs that are members of the loss measurement domain. In this way, a PE that does not have loss measurement capabilities may be ignored when performing the loss measurement techniques described herein.

In instances that use loss measurement domain identifiers, LMMs 27 maintain transmit and receipt counters for source L2 address, loss measurement domain identifier pairs. In other words, LMMs 27 maintain transmit and receipt counters for source L2 addresses "behind" the loss measurement domain.

LMMs 27 exchange transmit and receipt counter values to determine known unicast and multicast PDU loss during network 12 traversal between pairs of service endpoints of the VPLS instance implemented by VSIs 26. To determine known unicast PDU loss between a local service endpoint to a remote service endpoint, for example, the local one of LMMs 27 for the local service endpoint computes PDU loss for each direction of the service link 22 by computing differences between local and received, remote counter values for the service endpoints. LMMs 27 may exchange transmit and receipt counter values in loss measurement messages and loss measurement replies, as described in ITU-T Y.1731, incorporated above. Loss measurement messages and loss measurement replies may specify, in an organizationally unique identifier type-length-value field for example, a source L2 address, a service endpoint identifier, and/or a loss measurement domain identifier with which to identify a transmit and/or receipt counter for exchange and loss measurement computation.

In the illustrated instance, LMM 27C may send LMM 27B the receipt counter and transmit counter for the service endpoint identifier that corresponds to the service endpoint comprised by PE 16B. LMM 27B computes a far-end loss as the difference between the received receipt counter and the transmit counter for the service endpoint identifier that corresponds to the service endpoint comprised by PE 16C, where far-end PDU loss refers to the number of PDU switched in service packets by VSI 26C over service link 22B but not received by PE 16B. LMM 27B computes a near-end PDU loss as the difference between the received transmit counter and the receipt counter for the service endpoint identifier that corresponds to the service endpoint comprised by PE 16C, where near-end packet loss refers to the number of packets sent by PE 16B over service link 22B but not received by PE 16C. In some instances, LMMs 27 compute PDU loss at a finer granularity than the level of service endpoint by exchanging transmit and receipt counter values that are specific to particular L2 addresses of CEs 18 or other devices within customer networks 14.

To determine multicast PDU loss between an ingress service endpoint and one or more egress service endpoints, the corresponding one of LMMs 27 for the ingress service endpoint issues a multicast loss measurement message that the corresponding one of VSIs 26 switches to each of the egress endpoints. The multicast loss measurement message includes the replication factor at the ingress service endpoint for the VPLS instance. The multicast loss measurement message may further specify, in an organizationally unique identifier type-length-value field for example, a source L2 address, a service endpoint identifier, and/or a loss measurement domain identifier. The multicast loss measurement message may further specify a multicast transmit counter value for the multicast transmit counter that the LMM uses to track traffic exhibiting any of the aforementioned parameters.

The corresponding egress LMMs 27 for the egress service endpoints receive the replicated multicast loss measurement message and identify a multicast receipt counter for the specified identifier. In example implementation described above, the egress LMMs 27 may track received multicast PDUs using multicast receipt counters for service endpoint identifiers, loss measurement domains, and/or source L2 addresses.

Each of the egress LMMs 27 computes a respective return value based at least on the identified multicast receipt counter value for the LMM and the replication factor carried by the multicast loss measurement message. In some instances, the egress LMMs 27 compute the return value as the quotient of the identified multicast receipt counter value and the replication factor. The egress LMMs 27 respond to the multicast loss measurement message by returning their respective computed return values in a loss measurement reply message. In some instances, egress LMMs 27 copy a transmit counter value received in the multicast loss measurement message to the loss measurement reply message. Multicast loss measurement messages may carry a replication factor in a type-length-value field, which may include an organizationally unique identifier.

The ingress LMM 27 receives the one or more loss measurement reply messages sent by the egress LMMs 27 and sums the return values therein to compute an overall receipt value for the egress service endpoints of the VPLS instance for the multicast traffic transmitted from the ingress service endpoint. By dividing the multicast receipt counter values by the replication factor at the ingress service endpoint, the egress LMMs 27 account for the replication within the service when computing multicast PDU loss measurement. By accumulating the return values, the ingress LMM 27 in effect computes (in some instances, estimates) an average number of PDUs received by each egress service endpoint in the multicast domain for the PDUs transmitted at the ingress service endpoint. The ingress LMM 27 computes multicast PDU loss as a difference between the accumulated value and the corresponding multicast transmit counter value for the specified identifier.

In some aspects, rather than accounting for a replication factor at egress service points of the VPLS instance, in response to a multicast loss measurement message, each of egress LMMs 27 returns an identified multicast receipt counter value in a loss measurement reply to the ingress LMM 27. The ingress LMM 27, upon receiving loss measurement replies from each of the egress LMMs 27, accumulates the various multicast receipt counter values and divides the accumulated value by the replication factor stored by the ingress LMM 27 to account for replication by the ingress VSI 26. The ingress LMM 27 computes multicast PDU loss as a difference between the quotient value and the corresponding multicast transmit counter value for the specified identifier.

Network management system 8 communicates with PEs 16 via network system 10 to manage and oversee PEs 16 using a device management protocol. One example device protocol is the Simple Network Management Protocol (SNMP) that allows network management system 8 to traverse and modify management information bases (MIBs) that store configuration and performance data within each of PEs 16. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, the entire contents of which are incorporated herein by reference.

Network management system 8 may periodically, or under direction by an administrator, request service performance data including PDU loss data for service endpoint from PEs 16. PEs 16 perform the PDU loss measurement techniques described above to provide PDU loss data for the VPLS instance to network management system 8 responsive to the requests or, in some instances, periodically or upon occurrence of a defined event. PEs 16 may return, in addition to near-end and/or far-end known unicast and multicast PDU loss data for particular service endpoints, the appropriate unicast and multicast transmit counter data for the service endpoint to enable network management system 8 to compute a PDU loss ratio.

Applying the described techniques may improve loss measurement accuracy for VPLS and H-VPLS instances by actively correlating known unicast service traffic at service endpoints using service endpoint identifiers and by maintaining separate unicast and multicast counters for the service endpoints. The techniques may therefore reduce inaccuracies introduced by replicated unknown unicast traffic. Moreover, by accounting for replication factors at the egress service endpoints of an L2 multicast flow, the techniques may enable multicast loss measurement. Loss measurement results for the service may be used to calculate PDU loss ratios between service endpoint pairs or to provide an overall PDU loss ratio for the VPLS instance. These more accurate loss measurements for the VPLS instance may also, for example, improve the ability of the service provider of network 12 to verify to the customer networks 14 customer that operation of the VPLS instance meets the performance requirements of an SLA between the customer and the provider.

Figure 2:
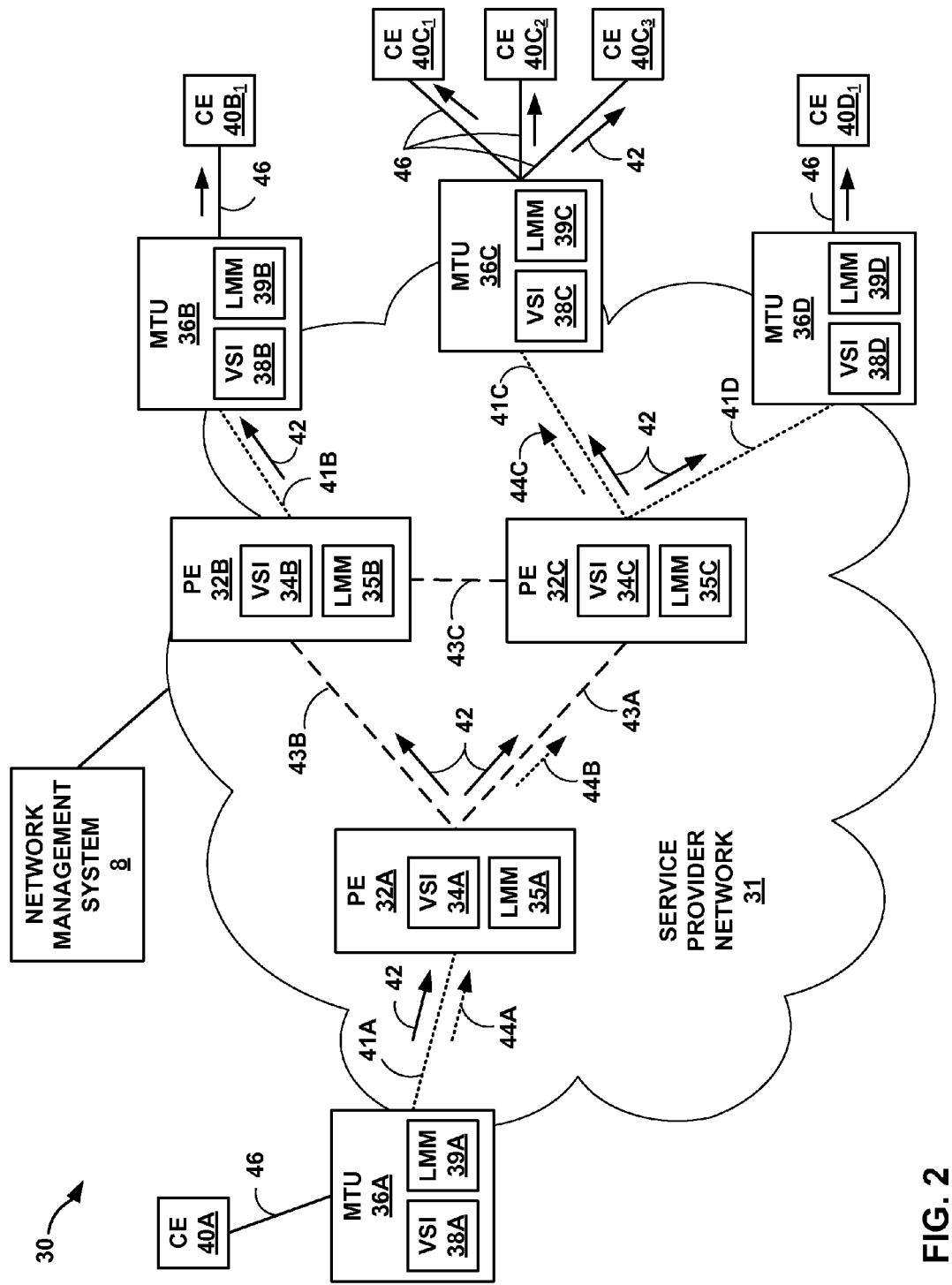
FIG. 2 is a block diagram illustrating another example network system in which one or more network devices monitor emulated service traffic at service endpoints and determine packet data loss according to the techniques described herein.

FIG. 2 is a block diagram illustrating an example network system 30 in which one or more network devices monitor emulated service traffic at service endpoints and determine packet data loss according to the techniques described herein. As shown in FIG. 2, network system 30 includes a service provider (SP) network 31 and CE devices 40A, 40B$_1$, 40C$_1$-40C$_3$, and 40D$_1$ (collectively, "CEs 40"). SP network 31 may represent an example embodiment of network 12 of FIG. 1 and, as such, PEs 32A-32C may represent example embodiments of PEs 16 of FIG. 1. Each of CEs 40 may represent an example embodiment of one of CEs 18 of FIG. 1 and resides at an edge of a corresponding customer network (not shown for ease of illustration).

The service provider for SP network 31 additionally deploys multi-tenant units 36A-36D ("MTUs 36") to serve one or more customers in, for example, multi-tenant buildings. Each of these customers may connect to remote customers over a different VPLS instance provided by SP network 31. CEs 40 connect to associated serving MTUs via one of attachment circuits 46, each of which may represent one of attachment circuits 20 of FIG. 1.

SP network 31 aggregates upstream MTU traffic from CEs 40 toward one of PEs 32 in a respective one of spoke service links 41A-41C ("spokes 41"). For example, MTU 36A aggregates customer L2 traffic from one or more customer sites (e.g., the customer network served by CE 40A) for transport via spoke 41A to PE 32A. Each of MTUs 36 supports L2 switching functionality including L2 learning and L2 packet replication and forwarding. In addition, MTUs 36 support virtual switching instances 38A-38D ("VSIs 38") for one or more L2VPNs provided by SP network 12. MTUs 36 thus offer functionality similar to that provided by PEs 32, in that the MTUs receive customer L2 PDUs via attachment circuits 46 and intelligently switch the L2 PDU toward remote customer network in accordance with a virtual switching instance. Moreover, while described with respect to multi-tenant units, the techniques described herein may be applied by any network device that supports L2 switching functions, including L2 learning and replication, such as a router or switch.

Service provider network 31 extends VPLS functionality from PEs 32 to MTUs 36 to create a hierarchical VPLS, or H-VPLS, instance to offer multipoint-to-multipoint connectivity to CEs 40. In this way, a full mesh of service links connecting MTUs 36 is avoided to improve scalability. VSIs 34A-34C of respective PEs 32 implement a full mesh of hub links 43A-43C that transport customer L2 PDUs switched by VSIs 34 to connect the PEs in a "hub" VPLS instance for the H-VPLS instance. Spokes 41 function as attachment circuits connecting MTUs 36 to the hub in a "spoke" VPLS instance for the H-VPLS instance. Each of hub links 43 and spokes 41 may be implemented, for example, as a pseudowire or with provider Virtual LANs that use customer specific VLAN tags to identify customer L2 traffic.

Multicast PDU 42 illustrates an example operation by the H-VPLS instance. MTU 36A receives multicast PDU 42 via one of attachment circuits 46 and switches multicast PDU 42 via spoke 41A to PE 32A in accordance with VSI 38A associated to the attachment circuit. In this way, the PDU 42 "enters" the hub formed by PEs 32. PE 32A is a hub "entrance" that applies VSI 34A identified by spoke 41A and replicates and switches multicast PDU 42 to PEs 32B, 32C via respective hub links 43B, 43A. PEs 32B, 32C may be referred to as "exit" PEs for multicast PDU 42. Exit PE 32A forwards multicast PDU 42 to MTU 36B via spoke 41B in accordance with VSI 34B, and exit PE 32B replicates and forwards multicast PDU 42 to MTUs 36C, 36D via spokes 41C, 41D in accordance with VSI 34C. Egress MTUs 36 for the customer L2 traffic, in turn, switch the traffic to one or more CEs 40 in accordance with VSIs 38.

LMMs 39A-39D of respective MTUs 36 and LMMs 35A-35C of respective PEs 32 maintain transmit and receipt counters for unicast and multicast PDUs that traverse the H-VPLS instance corresponding to VSIs 34 and VSIs 38. MTUs 36 comprise service endpoints for the H-VPLS instance. LMMs 39 may each represent one of LMMs 27 of FIG. 1 in that LMMs 39 perform similar functionality with respect to maintaining transmit and receipt counters, issuing loss measurement messages and loss measurement reply messages, computing PDU loss measurement using exchanged transmit and receipt counter values, and accounting for replication factors received in a multicast loss measurement message. LMMs 35 may each represent one of LMMs 27 of FIG. 1 in that LMMs 39 perform similar functionality with respect to storing and adding a replication factor to multicast loss measurement messages.

To measure known unicast and multicast PDU loss, LMMs 39 of MTUs 36 perform PDU loss measurement techniques similar to those described above with respect to LMMs 27 of FIG. 1. That is, MTUs 36 and PEs 32 may exchange service endpoint identifiers that identify individual MTUs 36 as comprising service endpoints for the H-VPLS instance. LMMs 39 maintain unicast transmit and receipt counters mapped to a service endpoint identifier to track unicast PDUs that traverse the service endpoints comprised by the corresponding MTUs 36 and that include a service endpoint identifier attached by VSIs 38 in the manner described above with respect to VSIs 26 of FIG. 1. LMMs 39 additionally maintain multicast transmit and receipt counters mapped to a service endpoint identifier, such as a service endpoint identifier, to track multicast PDUs that traverse the service endpoints comprised by the corresponding MTUs 36 and that include the service endpoint identifier. LMMs 39 exchange unicast transmit and receipt counter values to determine known unicast PDU loss during network 31 traversal between pairs of service endpoints of the H-VPLS instance implemented by VSIs 38 and VSIs 34 of PEs 32.

In some instances, PEs 32 and MTUs 36 exchange a loss measurement domain identifier with which each of the PEs and MTUs may express membership in a loss measurement domain for H-VPLS instance. In instances that use loss measurement domain identifiers, LMMs 39 maintain transmit and receipt counters for source L2 address, loss measurement domain identifier pairs. In other words, LMMs 39 maintain unicast and/or multicast transmit and receipt counters for source L2 addresses "behind" the loss measurement domain.

Each of LMMs 35 stores replication factors for the H-VPLS that represents a number of replicated multicast PDUs the corresponding one of PEs 32 outputs to other PEs 32 of the hub or to MTUs 36. Each of PEs 32 is a hub entrance for PDUs sourced by CEs 40 that connect to the H-VPLS instance via an MTU 36 connected by one of spokes 41 to the PE. Each of PEs 32 therefore stores a replication factor for the hub entrance replication, where the hub entrance replicator factor is the number of replicated multicast PDUs one of VSIs 34 outputs to other PEs 32 in the hub. Each of PEs 32 is additionally a hub exit for PDUs switched by VSIs 34 to MTUs 36 and therefore stores a replication factor for hub exit replication. The hub exit replication factor for one of PEs 32 is the number of replicated multicast PDUs the corresponding one of VSIs 34 switches to MTUs 36. In some instances, one or more of PEs 32 may connect directly to CEs 40 via an attachment circuit, and in such instances, the directly connecting PEs may not replicate multicast PDUs.

In the illustrated example, for instance, PE 32A is a hub entrance for PDU 42 for the H-VPLS instance. LMM 35A stores a hub entrance replication factor of value two for PE 32A for the H-VPLS instance that accounts for hub links 43A, 43C to PEs 32C, 32B, respectively. LMM 35B stores hub exit replication factor of value one for PE 32B for the H-VPLS instance that accounts for spoke 41B to MTU 36B. LMM 35C stores hub exit replication factor of value two for PE 32C for the H-VPLS instance that accounts for spokes 41C, 41D to MTUs 36C, 36D.

To determine multicast PDU loss between an ingress service endpoint and one or more egress service endpoints, the corresponding one of LMMs 39 for the ingress service endpoint issues a multicast loss measurement message that the corresponding one of VSIs 38 switches to one of PEs 32 (the hub entrance PE) for the ingress service endpoint. The multicast loss measurement message may specify, in an organizationally unique identifier type-length-value field for example, an identifier in the form of a source L2 address, a service endpoint identifier, and/or a loss measurement domain identifier, for instance. The multicast loss measurement message may further specify a multicast transmit counter value for the multicast transmit counter that the LMM uses to track traffic exhibiting any of the aforementioned parameters.

As hub PEs 32 switch the multicast loss measurement message to egress service endpoints comprised by MTUs 36, respective LMMs 35 of the PEs add the appropriate hub entrance or exit replication factor to the message. Replication factors values are specific to H-VPLS instances. LMMs 35 may determine whether a hub entrance or hub exit replication factor for H-VPLS instance should be added to a multicast loss measurement message based at least on the VSI 34 interface on which the message is received. LMMs 35 add the hub entrance replication factor to multicast loss measurement messages received on one of spokes 41 and add the hub exit replication factor to multicast loss measurement messages received on one of hub links 43.

The corresponding egress LMMs 39 for the egress service endpoints receive the replicated multicast loss measurement message from hub exit PEs 32 and identify a multicast receipt counter for the identifier specified in the message. Each of the egress LMMs 39 computes a respective return value based at least on the identified multicast receipt counter value for the LMM and the entrance and exit replication factors carried by the multicast loss measurement message. In some instances, the egress LMMs 39 compute the return value as the quotient of the identified multicast receipt counter value and of the product of the exit and entrance replication factors. The egress LMMs 39 respond to the multicast loss measurement message by returning their respective computed return values in a loss measurement reply message. In some instances, egress LMMs 39 copy a transmit counter value received in the multicast loss measurement message to the loss measurement reply message. Multicast loss measurement messages may carry entrance and exit replication factors in a type-length-value field, which may include an organizationally unique identifier.

The ingress LMM 39 receives the one or more loss measurement reply messages sent by the egress LMMs 39 and sums the return values therein to compute an overall receipt value for the egress service endpoints of the H-VPLS instance for the multicast traffic transmitted from the ingress service endpoint. By dividing the multicast receipt counter values by the product of the hub entrance and exit replication factors, the egress LMMs 39 account for the replication along a particular branch of the H-VPLS replication tree when computing multicast PDU loss measurement. By accumulating the return values, the ingress LMM 39 in effect computes (in some instances, estimates) an average number of PDUs received by each egress service endpoint in the multicast domain for the PDUs transmitted at the ingress service endpoint. The ingress LMM 39 computes multicast PDU loss as a difference between the accumulated value and the corresponding multicast transmit counter value for the specified identifier.

In the illustrated instance, for example, LMM 39A issues multicast loss measurement message 44A, specifying a service endpoint identifier for a service endpoint comprised by MTU 36A, via spoke 41A to PE 32A. LMM 35A of PE 32A adds the hub entrance replication factor with value two to replicated multicast loss measurement message 44B switched by VSI 34A to PE 32C (not all replicates of multicast loss measurement message 44 shown for ease of illustration). LMM 35C of PE 32C adds the hub exit replication factor with value two to replicated loss measurement message 44C switched by VSI 34C to MTU 36C. LMM 39C therefore receives a multicast loss measurement message 44C that carries hub entrance and exit replication factors with values two and two, respectively.

LMM 39C identifies the multicast receipt counter for the service endpoint identifier specified within multicast loss measurement message 44C and computes a return value as the quotient of the identified multicast receipt counter value and of the product of the hub entrance and exit replication factors (i.e., four). LMM 39C responds to multicast loss measurement message 44C with a loss measurement reply to LMM 39A that includes the computed return value. LMM 39A receives loss measurement replies from each of LMMs 39B-39D, accumulates the returned values, and uses the accumulated value and the corresponding multicast transmit counter value for the service endpoint identifier to compute a multicast PDU loss measurement value for the ingress service endpoint comprised by MTU 36A.

Network management system 8 communicates with PEs 32 and MTUs 36 via network system 30 to manage and oversee PEs 32 and MTUs 36 using a device management protocol, such as SNMP. Network management system 8 of FIG. 2 may be an example embodiment of network management system 8 of FIG. 1. Network management system 8 may periodically, or under direction by an administrator, request service performance data including known unicast and/or multicast PDU loss data for service endpoint comprised by MTUs 36 from the MTUs. MTUs 36 and PEs 32 perform the PDU loss measurement techniques described above to provide PDU loss data for the VPLS instance to network management system 8 responsive to the requests or, in some instances, periodically or upon occurrence of a defined event. PEs 16 may return, in addition to near-end and/or far-end known unicast and multicast PDU loss data for particular service endpoints, the appropriate unicast and multicast transmit counter data for the service endpoint to enable network management system 8 to compute a PDU loss ratio.

Applying the described techniques may improve loss measurement accuracy for H-VPLS instances by actively correlating known unicast service traffic at service endpoints using service endpoint identifiers and by maintaining separate unicast and multicast counters for the service endpoints. The techniques may therefore reduce inaccuracies introduced by replicated unknown unicast traffic. Moreover, by accounting for hub entrance and exit replication factors at the egress service endpoints of an L2 multicast flow, the techniques may enable multicast loss measurement. Loss measurement results for the service may be used to calculate PDU loss ratios between service endpoint pairs or to provide an overall PDU loss ratio for the H-VPLS instance. These more accurate loss measurements for the H-VPLS instance may also, for example, improve the ability of the service provider of network 31 to verify to a customer that operation of the H-VPLS instance meets the performance requirements of an SLA between the customer and the provider.

Figure 3:
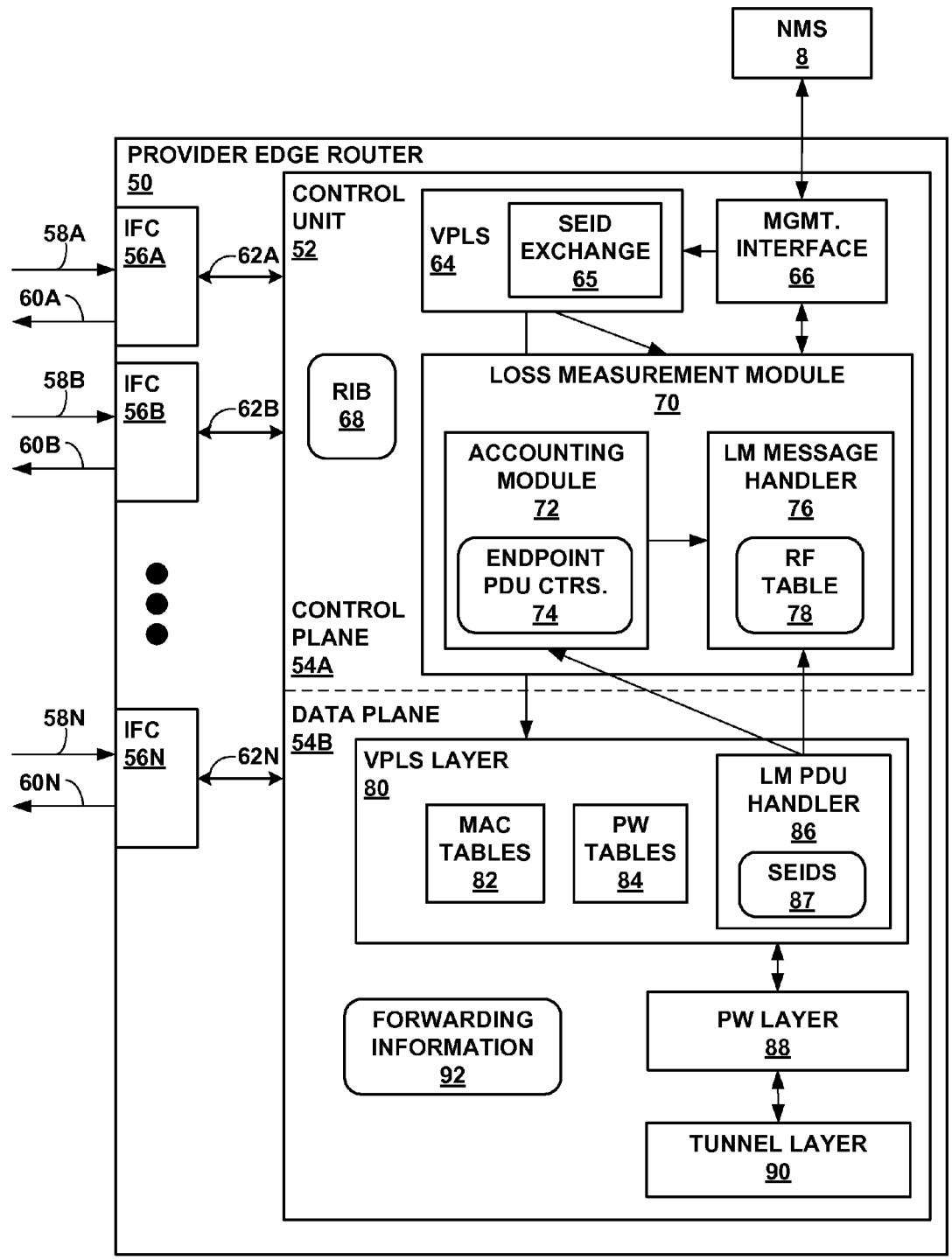
FIG. 3 is a block diagram illustrating example provider edge router that emulates service traffic in the context of a Virtual Private LAN Service (VPLS) or Hierarchical-VPLS instance and performs packet data unit (PDU) loss measurement techniques described in this disclosure.

FIG. 3 is a block diagram illustrating example provider edge router 50 ("router 50") that emulates service traffic in the context of a VPLS or H-VPLS instance and performs PDU loss measurement techniques described in this disclosure. Reference to a VPLS instance hereinafter may refer to a VPLS instance that is an H-VPLS instance. For purposes of illustration, router 50 may be described below within the context of an exemplary network system 10 of FIG. 1 that implements service links 22 with pseudowires and may represent any one of PEs 16. Moreover, while described with respect to a particular network device, e.g., a router, the techniques may be implemented by any network device that may operate as a service endpoint or H-VPLS hub router. For example, router 50 may also represent and perform the functionality of any of MTUs 36 or PEs 32 of FIG. 2. The techniques should therefore not be limited to the exemplary embodiments described in this disclosure.

Router 50 includes a control unit 52 and interface cards 56A-56N ("IFCs 56") coupled to control unit 52 via internal links 62A-62N. Control unit 52 may comprise one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 52 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 52 is divided into two logical or physical "planes" to include a first control or routing plane 54A and a second data or forwarding plane 54B. That is, control unit 52 implements two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 54A of control unit 52 executes the routing functionality of router 50. In this respect, control plane 54A represents hardware or a combination of hardware and software of control unit 52 that implements routing protocols (not shown in FIG. 3) by which routing information stored in routing information base 68 ("RIB 68") may be determined. RIB 68 may include information defining a topology of a network, such as SP network 12. Control plane 54A may resolve the topology defined by routing information in RIB 68 to select or determine one or more routes through the network. Control plane 54A may then update data plane 54B with these routes, where data plane 54B maintains these routes as forwarding information 92. Forwarding or data plane 54B represents hardware or a combination of hardware and software of control unit 52 that forwards network traffic in accordance with forwarding information 92.

Control plane 54A further comprises management interface 66 (illustrated as "mgmt. interface 66") by which network management system 8 (illustrated as "NMS 8"), or in some instances an administrator using a command line or graphical user interface, configures in VPLS module 64 ("VPLS 64") one or more VPLS instances for a network to interconnect combinations of Ethernet customer networks into a single Ethernet domain using pseudowires. For example, network management system 8 may configure router 50 as a participant in a particular VPLS instance, such as the VPLS instance implemented by VSIs 26 of FIG. 1 or the H-VPLS instance implemented by VSIs 34, 38, having an associated VPLS identifier. VPLS module 64 may perform auto-discovery or other techniques to determine additional PE routers or MTUs participating in a VPLS instance and additionally performing signaling to establish a full mesh of pseudowires between PE 50 and each of the additional PE routers. In the case of an H-VPLS instance, VPLS module 64 may perform signaling to establish one or more spokes and/or one or more hub links with one or more other MTUs and/or routers. VPLS module 64 may execute Label Distribution Protocol (LDP)- and/or Border Gateway Protocol (BGP)-based techniques to perform the auto-discovery and signaling.

Each established pseudowire is associated with an inbound pseudowire label, an outbound pseudowire label, an associated pseudowire identity. In the case of an H-VPLS instance, each established hub link or spoke is a pseudowire in this example. Upon establishing pseudowires for a VPLS instance, VPLS module 64 stores pseudowires identities for the pseudowires and attachment circuit identities for the VPLS instance in one of pseudowire tables 64 ("PW tables 64") in data plane 54B for the VPLS instance. Where router 50 represents a hub router for the H-VPLS, PW tables 64 includes pseudowire identities for hub links, as well as pseudowire identities for spokes that effectively operate as attachment circuits between MTUs and the hub routers. Where router 50 represents a spoke router or MTU, PW tables 64 includes pseudowire identities for spokes and attachment circuit identities that specify customer-facing interfaces for the H-VPLS instance.

Data plane 54B provides high-speed forwarding of network traffic received by interface cards 56 via inbound links 58A-58N. VPLS layer 80, pseudowire layer 88 (illustrated as "PW layer 88"), and tunnel layer 90 of data plane 54B process and forward received network traffic associated with VPLS instances in which router 50 participates in accordance with forwarding information 92, MAC tables 82, and PW tables 84. Each of VPLS layer 80, PW layer 88, and tunnel layer 90 represents components of data plane 54B to implement the respective functionality of the layer. For example, VPLS layer 80 represents hardware or a combination of hardware and software to implement virtual switching and other VPLS-related functionality for VPLS instances in which router 50 participates.

Tunnel layer 90 provides tunneling services to deliver one or more pseudowires over a packet-switched network to additional routers participating in VPLS instances. A single tunnel may carry one or more pseudowires. VPLS 64 may perform setup, maintenance, and tear-down signaling for tunnels underlying pseudowires of the VPLS instances. Tunnels implemented by tunnel layer 90 may include LSPs as well as GRE, L2TP, and IPsec tunnels. Tunnel layer 90 receives outbound pseudowire traffic and a specified tunnel identifier from pseudowire layer 88 and outputs the traffic in accordance with the specified tunnel. Tunnel layer 90 delivers pseudowire packets received via a tunnel to PW layer 88.

Pseudowire layer 88 selects VPLS instances to process received pseudowire packets based on the respective pseudowire label of the packet. That is, upon receiving a pseudowire-labeled packet from tunnel layer 90, PW layer 88 strips the pseudowire label from the PDU and selects the VPLS instance associated with the pseudowire identified by the label. In other words, the PW layer 88 uses the attached pseudowire label to demultiplex the PDU for handling by VPLS layer 80 according to the appropriate VPLS instance. Pseudowire layer 88 additionally receives outbound PDUs and pseudowire identities from VPLS layer 80, maps the pseudowire identities to outbound pseudowire labels for the pseudowires, attaches the outbound pseudowire labels to the PDUs, and sends the pseudowire traffic to tunnel layer 90 for output in packet-switched network tunnels that carry the pseudowire.

VPLS layer 80 of data plane 54B implements one or more VPLS instances in which router 50 participates by operating as a virtual switch or virtual bridge to interconnect multiple customer networks over a provider network, or to connect spokes and hub links of an H-VPLS instance. VPLS layer 80 performs L2 learning, that is, VPLS layer 80 "learns" customer device L2 addresses (hereinafter, "MAC addresses") from inbound PWs and inbound attachment circuit interfaces and associates those customer MAC addresses with corresponding outbound PWs and outbound attachment circuit interfaces. For each VPLS instance, VPLS layer 80 includes a respective one of PW tables 84 that stores pseudowire identifies for the VPLS instance as well as a respective one of MAC tables 82 that maps learned L2 addresses to outbound interfaces of IFCs 56, to pseudowire identities included in the respective PW table for the VPLS instance, or to pseudowire identities that represent a spoke for an H-VPLS instance.

VPLS 64 of control plane 54A includes service endpoint identifier exchange module 65 (illustrated as "SEID exchange 65") that extends VPLS signaling to provide and receive service endpoints identifiers (SEIDs) of a VPLS instance. An SEID is a unique identifier within a VPLS instance and may comprise, for example, a network address for router 50, an identifier for a customer device attached to the VPLS instance at router 50, or an identity set by an administrator via management interface 66. SEID exchange module 65 stores SEIDs for the VPLS instance to SEIDs 87 of VPLS layer 80 for use by loss measurement PDU handler 86 in performing loss measurement filtering and accounting techniques described herein. SEIDs 87 maps L2 addresses of customer devices to SEIDs for the ingress service endpoints for the customer devices. SEIDs 87 may be implemented as an associative data structure that maps a table of SEID-L2 address mappings to a VPLS instance implemented by VPLS layer 80. In some instances, SEIDs 87 or a copy thereof may be located within control plane 54A.

Loss measurement module 70 of control plane 54A illustrates LMMs 27 of FIG. 1 and LMMs 35, 39 of FIG. 2 in further detail. Accounting module 72 of loss measurement module 70 establishes and maintains, in endpoint PDU counters 74 (illustrated as "endpoint PDU ctrls. 74"), separate unicast and multicast transmit and receipt counters for each of SEIDs 87 for a VPLS instance. In some instances, accounting module 72 further maps endpoint PDU counters 74 to a loss measurement domain. In some instances, loss measurement module 70 may occupy data plane 54B. For example, loss measurement module 70 may be distributed to one or more packet forwarding engines each associated with one or more of IFCs 56.

Loss measurement PDU handler 86 (illustrated as "LM PDU handler 86" and hereinafter "handler 86") of VPLS layer 80 attaches an SEID shim header to PDUs received by router 50 at an ingress service endpoint of a VPLS instance. In other words, when router 50 receives a PDU on an inbound interface for one of inbound links 58 that is an attachment circuit for a VPLS instance in which router 50 participates, handler 86 determines whether the PDU is a multicast PDU or whether destination L2 address for the PDU is present in MAC tables 82 for the VPLS instance and the PDU is therefore known unicast. If so, handler 86 determines the SEID for the VPLS instance and attaches a shim header to the PDU that specifies the SEID. VPLS layer 80 switches the PDU with attached shim header to a pseudowire for the VPLS instance in accordance with MAC tables 82 and PW tables 84. If the PDU is unknown unicast, handler 86 does not attach a shim header and VPLS layer 80 broadcasts the PDU over core-facing pseudowires specified by PW tables 84 for the VPLS instance.

If the PDU is multicast, handler 86 directs accounting module 72 to increment a multicast transmit counter in endpoint PDU counters 74 for the SEID for the service endpoint comprised by router 50. If the PDU is known unicast, handler 86 directs accounting module 72 to increment a unicast transmit counter in endpoint PDU counters 74 for the SEID for the service endpoint comprised by router 50.

Handler 86 additionally inspects PDUs received from PW layer 88 to determine whether the PDUs include attached shim headers that specify SEIDs for ingress service endpoints of the PDUs. For each PDU with an attached shim header, handler 86 determines the specified SEID and further determines whether the PDU is of multicast or unicast type. Handler 86 directs accounting module 72 to increment the appropriate multicast or unicast receipt counter for the determined SEID for the PDU type. VPLS layer 80 then switches the PDU. In addition, handler 86 maps the L2 source address of the PDU representing a customer device to the determined SEID in SEIDs 87.

Loss measurement module 70 determines PDU loss for between the service endpoint comprised by router 50 and other service endpoints for VPLS instances in which router 50 participates. In one example, loss measurement module 70 reads unicast transmit and receipt counter values of endpoint PDU counters 74 for a local, remote service endpoint pair and additionally receives remote transmit and receipt counter values for the local, remote service endpoint pair from a network device that comprises the remote service endpoint. Using the read and received counter values, loss measurement module 70 computes, for the service endpoint pair, PDU loss measurement statistics based on the differences between transmit and receipt counter values for each direction of PDU traffic between the service endpoints.

Loss measurement message handler 76 (illustrated as "LM message handler 76" and hereinafter "LMM handler 76") of loss measurement module 70 generates and handles loss measurement messages and loss measurement replies for router 50 to exchange transmit and receipt counters and, in some instances, to add replication factors to in-transit loss measurement messages. LMM handler 76 may establish, for example, a transmission control protocol (TCP) session or other high-layer session with the additional network devices to exchange messages to obtain remote counter values for the service endpoints. In some examples, LMM handler 76 injects loss measurement messages "in-profile" into pseudowires at PW layer 88 and receives loss measurement replies filtered by handler 86 to control plane 54A in order to exchange messages with the additional network devices to obtain remote counter values for service endpoints. Loss measurement messages generated by LMM handler 76 specify an SEID for a service endpoint comprised by router 50.

LMM handler 76 may additionally issue multicast loss measurement messages specifying an SEID for a service endpoint of a VPLS instance comprised by router 50. Replication factor table 78 (illustrated as "RF table 78") maps replication factors for router 50 to VPLS instances in which the router participates. Where the VPLS instance is a standard VPLS, replication factor table 78 maps a value N−1 to the VPLS instance, where N is the number of routers participating in the VPLS instance. Where the VPLS instance is an H-VPLS and router 50 participates as a hub router for the VPLS instance, replication factor table 78 maps both hub entrance and hub exit replication factors for router 50 to the VPLS instance. Replication factor table 78 may map replication factors to VPLS instances by mapping the replication factors to respective pseudowire identifiers for pseudowires of the VPLS instances.

In the case of a standard VPLS, LMM handler 76 determines the replication factor for a VPLS instance and adds the replication factor to multicast loss measurement messages that specify an SEID for a service endpoint of the VPLS instance comprised by router 50. In the case of an H-VPLS, LMM handler 76 may not add a replication factor to issued multicast loss measurement messages when router 50 comprises the ingress service endpoint for the multicast PDU flow under analysis, for router 50 in such instances attaches to the H-VPLS hub over a single spoke. Where router 50 is a hub router for the H-VPLS, LM PDU handler 86 filters a received multicast loss measurement message for the H-VPLS to LMM handler 76, which determines whether the router is a hub entrance or hub exit for the received multicast loss measurement message, determines the appropriate replication factor in replication factor table 78 for the H-VPLS, and adds the replication factor to the multicast loss measurement message. VPLS layer 80 switches the modified multicast loss measurement message according to MAC tables 82 and PW tables 84.

Handler 86 additionally filters received loss measurement messages (both unicast and multicast) to LMM handler 76, which generates and sends corresponding loss measurement replies to the respective network device that issued the loss measurement messages. To determine return values for a particular loss measurement reply, handler 86 identifies the SEID mapped to the L2 source address for the corresponding loss measurement message in SEIDs 87 and provides this ingress SEID to LMM handler 76, which obtains the appropriate receipt counter value for the SEID in endpoint PDU counters 74 and adds the value to the loss measurement reply. In the case of a multicast loss measurement message, loss measurement module 70 computes a return value based on the multicast receipt counter value for the SEID and the one or more replications factors included in the loss measurement message.

Handler 86 additionally filters received loss measurement replies to LMM handler 76. Loss measurement module 70 uses the counter values included in loss measurement replies to compute PDU loss measurement between service endpoints. Loss measurement module 70 provides computed PDU loss measurement statistics for the service endpoints to NMS 8 via management interface 66. In various aspects, loss measurement module 70 may perform PDU loss measurement determination techniques autonomously (i.e., "proactively") or responsive to requests from NMS 8 via management interface 66 (i.e, "on-demand"). As a result, router 50 operating according to the techniques of this disclosure may accurately provide to NMS 8 PDU loss measurement statistics for service endpoints of VPLS instances in which router 50 participates. NMS 8 may thus use the PDU loss measurement statistics for the VPLS instances to determine an accurate, overall PDU loss for any particular VPLS instance in which router 50 participates.

In some embodiments, aspects of data plane 54B are distributed to a number of distributed forwarding units, such as packet forwarding engines, each associated with a different one or more IFCs 56. In these embodiments, LM PDU handler 86 may be distributed to the distributed forwarding units to enable high-speed shim header attachment and identification and loss measurement message/loss measurement reply filtering within the data plane.

Figure 4:
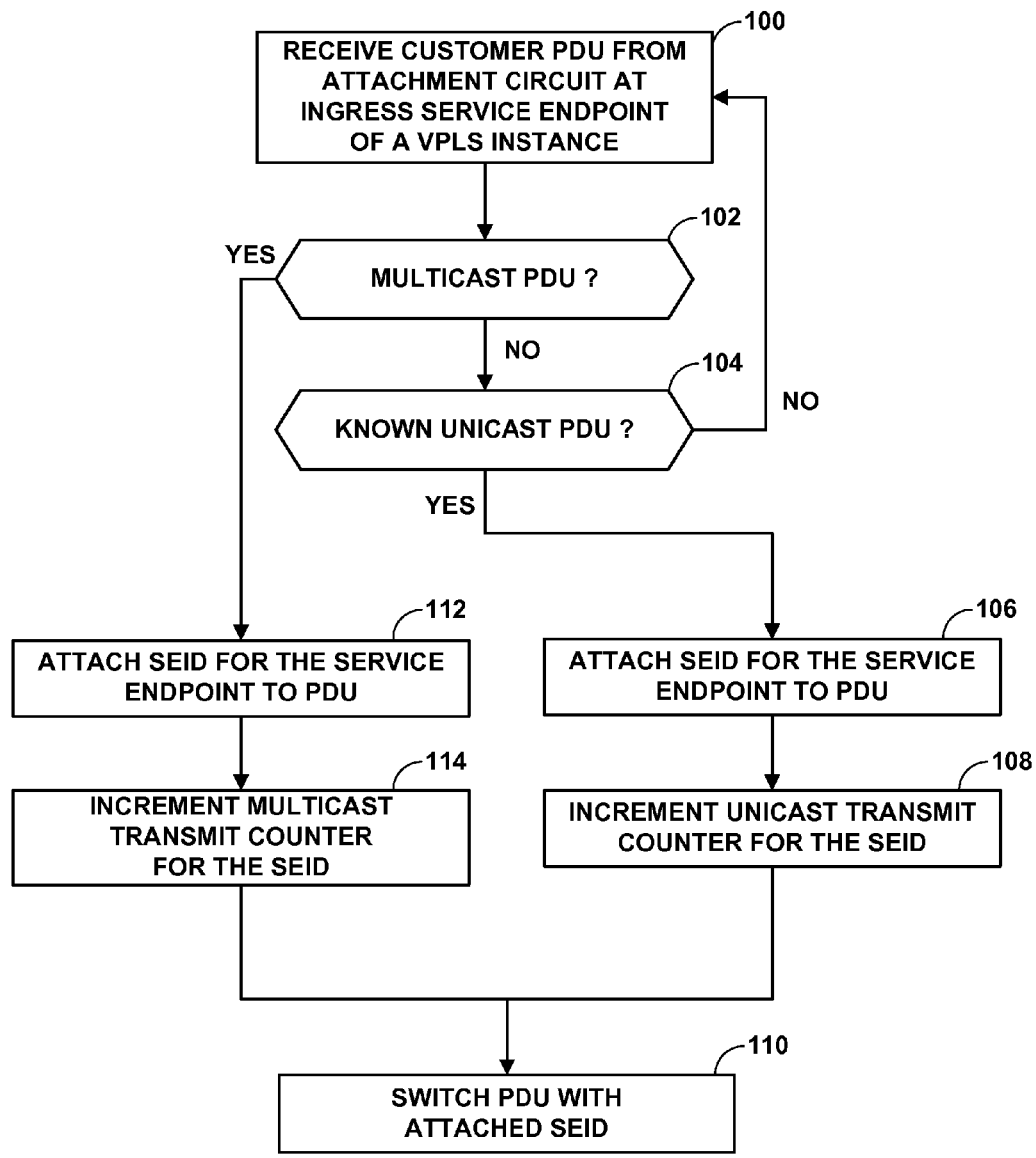
FIG. 4 is a flowchart illustrating an example mode of operation of the router of FIG. 3 to attach a shim header specifying a service endpoint identifier and to track transmitted PDUs according to the techniques described herein.

FIG. 4 is a flowchart illustrating an example mode of operation of router 50 of FIG. 3 to attach a shim header specifying a service endpoint identifier and to track transmitted PDUs according to the techniques described herein. One of IFCs 56 receives a customer PDU at an attachment circuit interface of one of inbound links 58, where the attachment circuit is associated with a VPLS instance in which router 50 participates (100). Loss measurement PDU handler 86 determines whether the PDU is a multicast PDU (102) and, if so (YES branch of 102), determines the SEID in SEIDs 87 for the service endpoint comprised by router 50 and attaches a shim header to the PDU that specifies the determined SEID (112). Handler 86 then directs accounting module 72 to increment the multicast transmit counter for the SEID (114), and VPLS layer 80 switches the PDU with attached shim header toward one or more egress service endpoints (110).

If the PDU is a unicast PDU (NO branch of 102), handler 86 determines whether the PDU L2 destination address is learned within MAC tables 82 for the VPLS instance (104). If the destination address is learned and the PDU is therefore known unicast (YES branch of 104), handler 86 determines the SEID in SEIDs 87 for the service endpoint comprised by router 50 and attaches a shim header to the PDU that specifies the determined SEID (106). Handler 86 then directs accounting module 72 to increment the unicast transmit counter for the SEID (108), and VPLS layer 80 switches the PDU with attached shim header toward one or more egress service endpoints (110).

Figure 5:
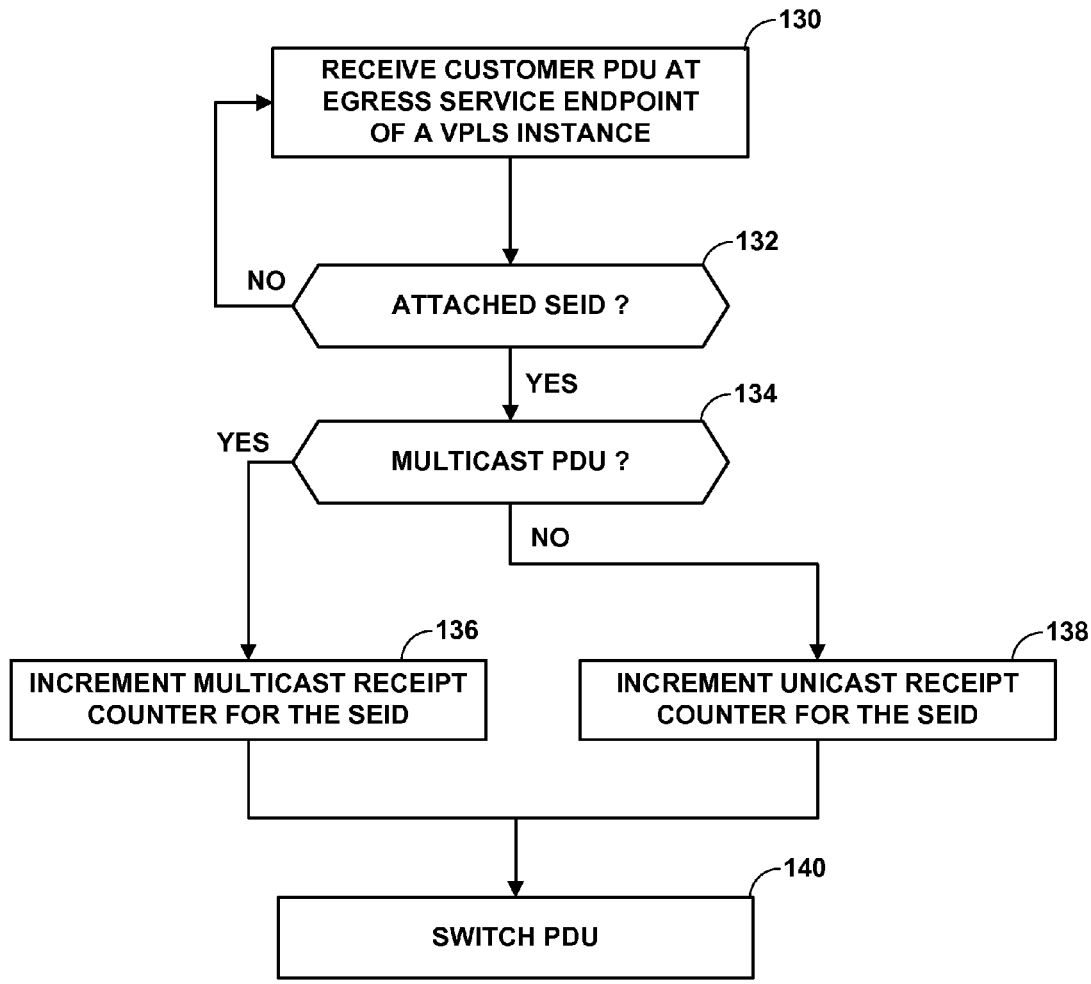
FIG. 5 is a flowchart illustrating an example mode of operation of the router of FIG. 3 to track received PDUs according to the techniques described herein.

FIG. 5 is a flowchart illustrating an example mode of operation of router 50 of FIG. 3 to track received PDUs according to the techniques described herein. Initially, one of IFCs 56 receives a customer PDU at a pseudowire interface of one of inbound links 58, where the pseudowire egress is associated with an egress service endpoint of a VPLS instance in which router 50 participates (130). If the PDU includes an attached shim header that specifies an SEID (YES branch of 132), loss measurement PDU handler 86 determines whether the PDU is a multicast PDU (134). If the PDU is multicast (YES branch of 134), handler 86 directs accounting module 72 to increment the multicast receipt counter for the SEID (136). Otherwise (NO branch of 134), handler 86 directs accounting module 72 to increment the unicast receipt counter for the SEID (138). VPLS layer 80 switches the PDU to one or more attachment circuits for the VPLS instance (140).

Figure 6:
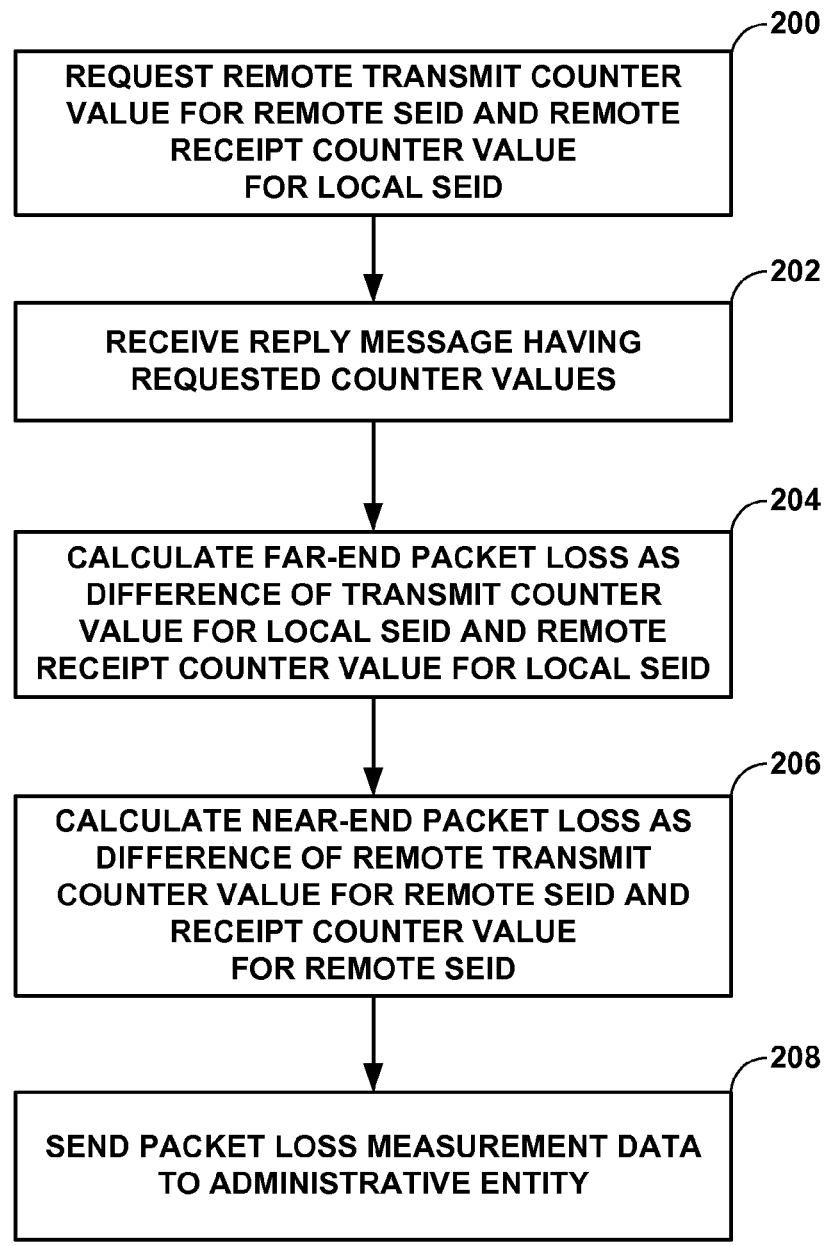
FIG. 6 is a flowchart illustrating an example mode of operation of the of FIG. 3 to determine known unicast PDU loss between local and remote service endpoints of a VPLS instance in accordance with the described techniques.

FIG. 6 is a flowchart illustrating an example mode of operation of router 50 of FIG. 3 to determine unicast PDU loss between local and remote service endpoints of a VPLS instance in accordance with the described techniques. Loss measurement message handler 76 generates and sends a loss measurement message to another network device to request a remote transmit counter value for a remote service endpoint identified by a remote SEID as well as a remote receipt counter value for the local SEID of the local service endpoint comprised by router 50 (200). LMM handler 76 may generate the loss measurement message to specify the local SEID within a type-length-value field or within a shim header. Further, LMM handler 76 may specify in the loss measurement message the remote SEID or an L2 address for a customer device serviced the remote service endpoint. LMM handler 76 receives a loss measurement reply from the network device that comprises the remote service endpoint (202). Loss measurement module 70 calculates the far-end PDU loss between the service endpoints as a difference between a local transmit counter value for the local SEID in endpoint PDU counters 74 and the received, remote receipt counter value for the local SEID (204). Loss measurement module 70 also calculates the near-end PDU loss between the service endpoints as a difference between the received, remote transmit counter value for the remote SEID and a local receipt counter value for the remote SEID in endpoint PDU counters 74 (206). Loss measurement module 70 sends PDU loss measurement data based on the computed near-end and far-end PDU loss between the service endpoints to NMS 8 via management interface 66 (208).

Figure 7:
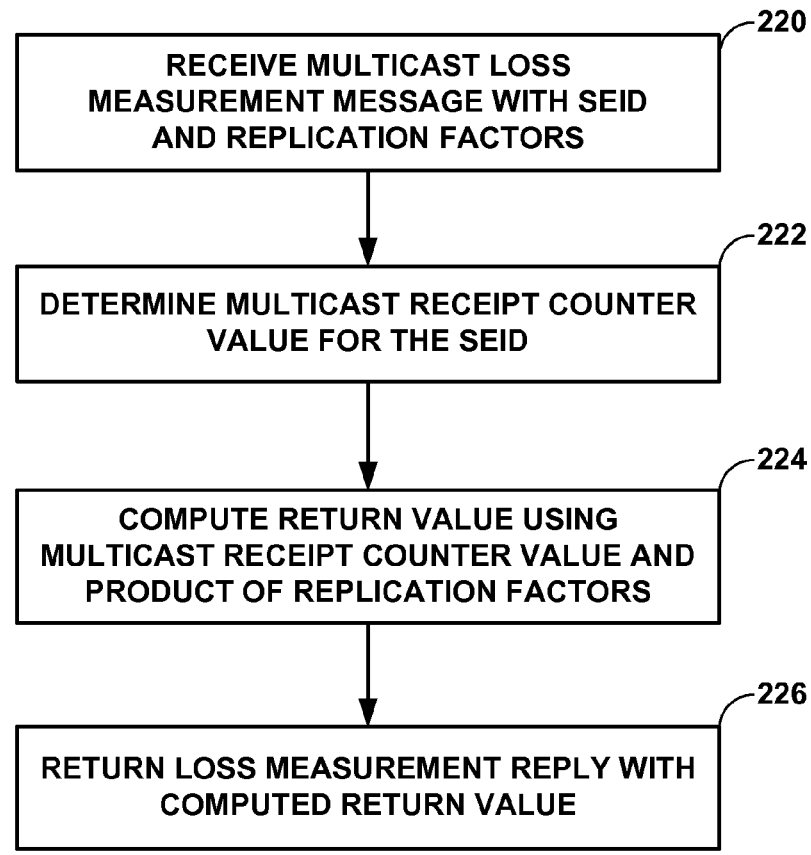
FIG. 7 is a flow chart illustrating an example mode of operation of the router of FIG. 3 to determine a return value for a loss measurement reply responsive to a received multicast loss measurement message according to the described techniques.

FIG. 7 is a flow chart illustrating an example mode of operation of router 50 of FIG. 3 to determine a return value for a loss measurement reply responsive to a received multicast loss measurement message according to the described techniques. Loss measurement module 70 receives a multicast loss measurement message for a VPLS instance from another network device that participates in the VPLS instance (220). The multicast loss measurement message species an SEID for an ingress service endpoint of a multicast PDU flow as well as one or more replication factors that represent a number of replications performed by replication points in the VPLS instance for multicast PDUs of the multicast PDU flow from the specified SEID. Loss measurement module 70 determines the multicast receipt counter value in endpoint PDU counters 74 for the specified SEID (222) and computes a return value using the determined value and the replication factors included within the loss measurement message (224). For example, loss measurement module 70 may compute the return value as the quotient of the determined value and the product of the replication factors. The return value may be an integer, in which case any quotient remainder may be ignored. LMM hander 76 returns a loss measurement reply that includes the return value to the network device that issued the loss measurement message.

Figure 8:
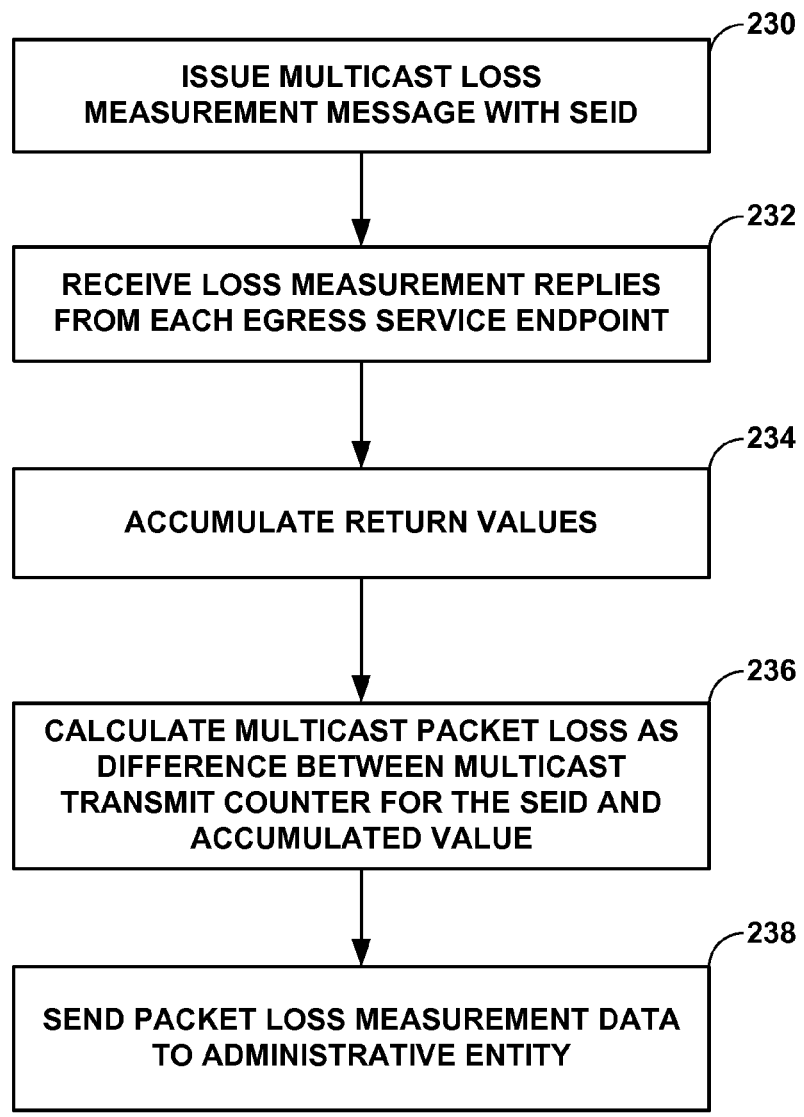
FIG. 8 is a flow chart illustrating an example mode of operation of the router of FIG. 3 to determine multicast PDU loss between ingress and egress service endpoints of a VPLS instance for a multicast PDU flow using the techniques described herein.

FIG. 8 is a flow chart illustrating an example mode of operation of router 50 of FIG. 3 to determine multicast PDU loss between ingress and egress service endpoints of a VPLS instance for a multicast PDU flow using the techniques described herein. LMM handler 76 issues a multicast loss measurement message that includes the SEID for the ingress service endpoint of the VPLS instance comprised by router 50 (230). Subsequently, LMM handler 76 receives one or more loss measurement replies, response to the multicast loss measurement message, from network devices that comprise the egress service endpoints of the VPLS instance for the multicast PDU flow (232). Each of the loss measurement replies includes a return value computed by the network device that comprises the associated egress service endpoint. Loss measurement module 70 of router 50 accumulates the one or more return values (234) and calculates multicast PDU loss within the VPLS instance as a difference between a multicast transmit counter for the SEID in endpoint PDU counters 74 and the accumulated value (236). Loss measurement module 70 sends PDU loss measurement data based on the calculated multicast PDU loss between the ingress and egress service endpoints to NMS 8 via management interface 66 (238).

FIG. 9 is a block diagram illustrating replication factor table 300, an example embodiment of replication factor table 78 of router 50 of FIG. 3. In the illustrated embodiment, replication factor table 300 includes replication factor entries 302A-302C that each map both a hub entrance and hub exit replication factor to a loss measurement domain ("LM domain") for an H-VPLS instance. In some embodiments, each of replication factor entries 302A-302C additionally or alternatively includes a service endpoint identifier to which the entries map the corresponding replication factors. In use by a hub router of the H-VPLS instance, such as router 50 of FIG. 3 operating as a hub router, LMM handler 76 receives a loss measurement message that identifies a loss measurement domain. If LMM handler 76 received the loss measurement message on a spoke of the H-VPLS, LMM handler 76 adds the entrance replication factor for the identified loss measurement domain prior to switching of the loss measurement module 70 by VPLS layer 80. Otherwise, LMM handler adds the exit replication factor for the identified loss measurement domain.

FIG. 10 is a block diagram illustrating example local endpoint unicast PDU counters 310 ("local counters 310") and remote endpoint unicast PDU counters 314 ("remote counters 310") comprised by separate network devices that implement the techniques of this disclosure. Local counters 310 represent an example embodiment of endpoint PDU counters 74 of router 50 of FIG. 3 operating as MTU 36A within the context of network system 30 of FIG. 2. Remote counters 314 represent an example embodiment of endpoint PDU counters 74 of router 50 of FIG. 3 operating as MTU 36B within the context of network system 30 of FIG. 2. Local counters 310 includes local counter entries 312A-312B that each map a transmit ("TX") and receipt ("RX") counter to a service endpoint identifier ("SEID") that identifies a service endpoint in the H-VPLS instance illustrated in FIG. 3. Similarly, remote counters 314 includes remote counter entries 316A-316B that each map a transmit ("TX") and receipt ("RX") counter to an SEID that identifies a service endpoint in the H-VPLS instance illustrated in FIG. 3. In this example, MTU 36A, 36B use identifiers for customer devices, such as MAC addresses for the customer device, as SEIDs for the service endpoints.

In an example operation, described with respect to components of router 50 of FIG. 3, LM PDU handler 86 of MTU 36A attaches a local SEID for the service endpoint comprised by MTU 36A (in this example, "CE_40A") to an outbound customer PDU for the VPLS instance and VPLS layer 80 switches the PDU and attached SEID toward MTU 36B. PDU handler 86 of MTU 36A determines the remote SEID for the destination L2 address of the PDU (in this example, "CE_40B$_1$") and directs accounting module 72 to increment the transmit counter of local counter entry 312A mapped to the remote SEID.

VPLS layer 80 receives the transmitted PDU and LM PDU handler 86 of MTU 36B identifies the local SEID attached to the PDU. LM PDU handler 86 directs accounting module 72 to increment the RX counter of remote counter entry 316A mapped to the local SEID. Loss measurement module 70 of MTU 36B provides transmit and receipt counter values of remote counter entry 316A to loss measurement module 70 of MTU 36A, which computes PDU loss in accordance with the techniques described with respect to FIG. 6. In this way, MTUs 36A, 36B determine unicast packet loss between their respective service endpoints.

Figure 11:
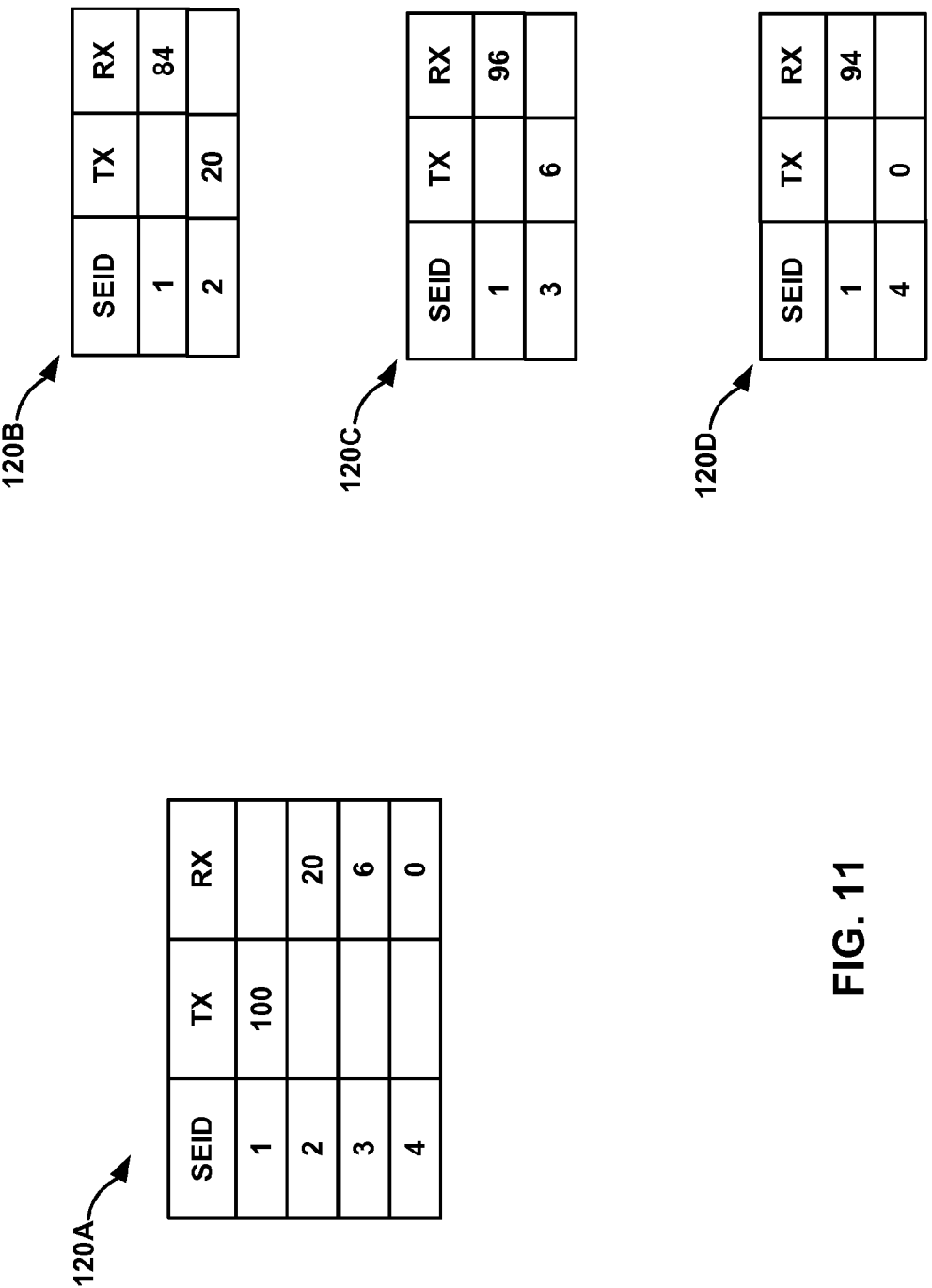
FIG. 11 is a block diagram illustrating example endpoint multicast PDU counters for respective MTUs of FIG. 2.

FIG. 11 is a block diagram illustrating example endpoint multicast PDU counters 120A-120D for respective MTUs 36A-36D of FIG. 2. Each counter entry in endpoint multicast PDU counters 120 is mapped to an SEID for a service endpoint comprised by one of MTUs 36. For example, endpoint multicast PDU counter 120A maps a transmit ("TX") counter to SEID "1" that identifies a service endpoint comprised by MTU 36A. Endpoint multicast PDU counter 120A additionally maps a receipt ("RX") counter to SEID "2" that identifies a service endpoint comprised by MTU 36B.

As described with respect to FIG. 3, each of CEs 40 attached to MTUs 36 uses the H-VPLS instance. In some examples, one or more of CEs 40 may not connect to the H-VPLS instance, and in such examples each of endpoint multicast PDU counters 120A-120D may include an additional column to disambiguate among service endpoints for a plurality of CEs 40 attached to a single one of MTUs 36.

In an example operation in the context of network system 30 of FIG. 2, MTU 36A issues a multicast loss measurement message that specifies SEID "1". PEs 32 of FIG. 3 add entrance and exit replication factors to the multicast loss measurement message as the message traverses the H-VPLS hub. Each of MTUs 36B-36D computes a return value for a loss measurement reply to the multicast loss measurement message that they received. MTU 36B receives a loss measurement message that specifies a hub entrance replication factor of two (due to the two hub links 43B, 43A) and a hub exit replication factor of one (spoke 41B). MTU 36B determines the multicast receipt counter value in endpoint multicast PDU counters 120B for SEID "1" and computes the quotient of the value and the product of the replication factors as return value=84/(2*1)=42 and sends the return value to MTU 36A in a loss measurement reply. MTU 36C and MTU 36D receive a loss measurement message that specifies a hub entrance replication factor of two (due to the two hub links 43B, 43A) and a hub exit replication factor of two (spoke 41C, 41D). MTU 36C determines the multicast receipt counter value in endpoint multicast PDU counters 120C for SEID "1" and computes the quotient of the value and the product of the replication factors as return value=96/(2*2)=24 and sends the return value to MTU 36A in a loss measurement reply. Similarly, MTU 36D determines the multicast receipt counter value in endpoint multicast PDU counters 120D for SEID "1"

and computes the quotient of the value and the product of the replication factors as return value=94/(2*2)=24 and sends the return value to MTU 36A in a loss measurement reply.

MTU 36A therefore receives values of 42, 24, and 24 in loss measurement replies responsive to the multicast loss measurement message. MTU 36A accumulates the values as follows, 42+24+24=90, and computes a difference between the multicast transmit counter value in endpoint multicast PDU counters 120A for SEID "1" and the accumulated value. The difference value of 10 represents the multicast PDU loss between the ingress service endpoint of the H-VPLS comprised by MTU 36A and egress service endpoints of the H-VPLS comprised by MTUs 36B-36D.

Figure 12:
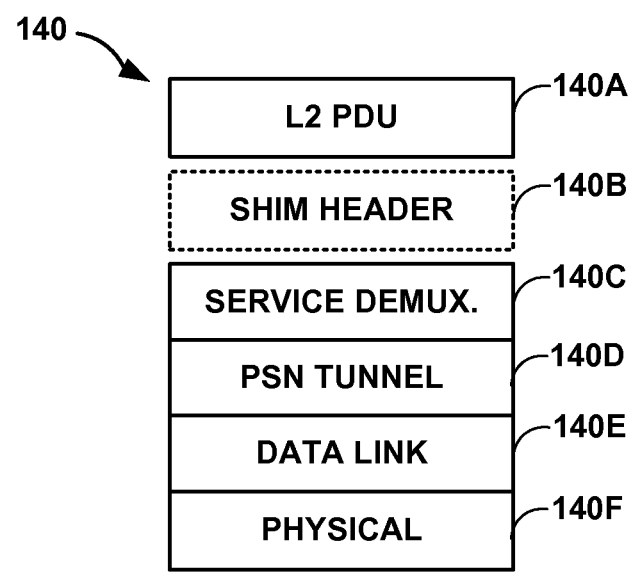
FIG. 12 is a block diagram illustrating an example logical protocol-layering model to support the PDU loss measurements techniques of this disclosure.

FIG. 12 is a block diagram illustrating an example logical protocol-layering model 140 ("protocol model 140") to support the PDU loss measurements techniques of this disclosure. Protocol model 140 includes emulated service layer 140A that carries L2 PDUs in this example, shim header layer 140B, service demultiplexer layer 140C, packet-switched network (PSN) tunnel layer 140D, data link layer 140E, and physical layer 140F. With the exception of shim header layer 140B, the various layer of protocol model 140 are described in detail in "Pseudo Wire Emulation Edge-to-Edge (PWE3) Architecture," incorporated above. Shim header layer 140B is carried by service demultiplexer layer 140C and allows network devices that participate in a VPLS instance to identify L2 PDUs of emulated server layer 140C as known unicast. Shim header layer 140B further allows the network devices to identify ingress service endpoints for both unicast and multicast L2 PDUs. In some embodiments, shim header layer 140B additionally, or alternatively, carries a loss measurement domain identifier to allow network devices to determine the domain of network devices that will participate in loss measurement for the VPLS instance.

Figure 13:
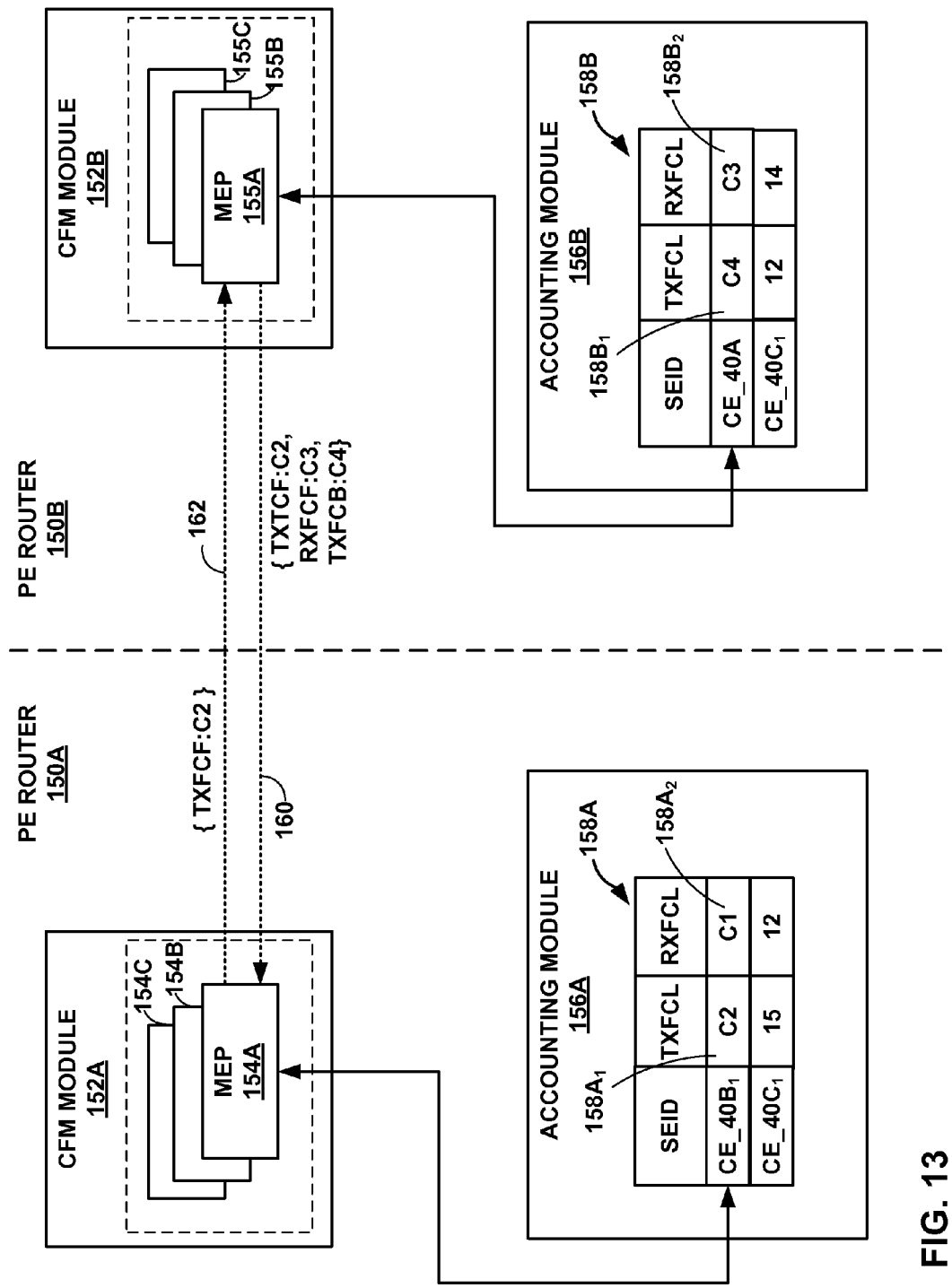
FIG. 13 is a block diagram illustrating Connectivity Fault Management ("CFM") modules and accounting modules that monitor known unicast and multicast PDU traffic and exchange PDU counter data to provide PDU loss measurement results in accordance with the techniques described herein.

FIG. 13 is a block diagram illustrating Connectivity Fault Management ("CFM") modules 152A, 152B ("CFM modules 152") and accounting modules 156A, 156B ("accounting modules 156") of respective PE routers 150A, 150B ("PE routers 150") that monitor known unicast and multicast PDU traffic and exchange PDU counter data to provide PDU loss measurement results in accordance with the techniques described herein. PE routers 150A, 150B may each represent any of PEs 16 of FIG. 1, or PEs 32 or MTUs 32 of FIG. 2, or router 50 of FIG. 3. Accounting modules 156A, 156B may each represent any accounting module 72 of FIG. 3. CFM modules 152 may each represent loss measurement module 70 of FIG. 3. Accordingly, each of CFM modules 152 may be distributed to respective packet forwarding engines of the associated one of PE routers 150. For example, a packet forwarding engine of PE router 150A may comprise one or more of MEPs 154 that serve service endpoints that send/receive packets at interface cards associated with the packet forwarding engine.

Conventional maintenance entities (MEs), as described for example in ITU-T Y.1731 incorporated above, refer to a single point-to-point (P2P) Ethernet connection, such as that provided at the customer-facing interfaces of a virtual circuit to implement a P2P L2VPN. A multipoint-to-multipoint (MP2MP) Ethernet connection, such as that provided by a VPLS over a service provider network, includes a number of maintenance entities that each represents a P2P Ethernet connection within the MP2MP Ethernet connection. Each ME in an MP2MP Ethernet connection terminates at one of the points of the Ethernet connection. That is, multiple MEs may terminate at a single service point. Moreover, conventional MEPs that apply OAM techniques do not have a mechanism for correlating ingress Ethernet traffic at an inbound Ethernet connection for a MEG that includes the MEPs with particular egress Ethernet traffic at an outbound Ethernet connection for the MEG. As a result, Ethernet traffic that is replicated by the provider of the Ethernet service may be inaccurately counted multiple times at various egress MEPs that all connect to single ingress MEP for the MP2MP Ethernet connection due to BUM traffic across the service.

CFM modules 152 includes respective maintenance entity group endpoints (MEPs) 154A-154C and 155A-155C ("MEPs 154, 155") that each mark a service endpoint of an L2VPN, such as a VPLS instance, in which the corresponding one of PE routers 150 participates. Accounting modules 156 track known unicast PDU packets that traverse service endpoints of PE routers 150 by incrementing counter fields of a corresponding one of endpoint PDU counters 158A, 158B, while refraining from counting unknown unicast PDU packets, using techniques described in this disclosure.

MEPs 154, 155 exchange endpoint PDU counter values to measure PDU loss using the messaging protocol described in ITU-T Y.1731. MEPs 154, 155 may perform single-ended and/or dual-ended PDU loss measurement. Moreover, while MEPs 154, 155 may perform proactive and/or periodic loss measurement, the techniques are described with respect to periodic loss measurement for single-ended, on-demand OAM in which MEP 154A and MEP 155A exchange loss measurement messages (LMMs) and loss measurement replies (LMRs) having embedded endpoint PDU counter values and formed in accordance with the loss measurement message protocol described in ITU-T Y.1731.

MEP 154A initiates an on-demand loss measurement by issuing LMM 162 in-profile to MEP 155A. That is, MEP 154A sends LMM 162 to MEP 155A over VPLS instance for which the MEPs operate as endpoints. LMM 162 includes TxFCf value C2, the value of local transmission counter (TxFCL) $158A_1$ for the service endpoint at the time MEP 154A issues LMM 162. Responsive to receiving LMM 162, MEP 155A issues LMR 160 that includes TxTCf value C2 copied from the TxFCf value of LMM 162; RxFCf value C3, the value of remote receipt counter (RxFCl) $158B_2$ at the time of LMM 162 reception; and TxFCb value C4, the value of remote transmission counter (TxFCl) $158B_1$ at the time of LMR 160 transmission.

In this way, the MEPs 154, 155 replace conventional Ethernet service counter values with endpoint unicast PDU counter values. In some instances, MEPs 154, 155 issue LMMs/LMRs that have an Opcode or Version number that identifies the messages as carrying endpoint PDU counter values. In some instances, MEPs 154, 155 issue LMMs/LMRs having appended Type-Length-Value fields that carry the endpoint PDU counter values. In this way, MEPs 154, 155 may disambiguate conventional LMMs/LMRs from LMMs/LMRs formed according to the described techniques. MEPs 154, 155 may exchange LMMs/LMRs in-profile or in a separate communication session between PE routers 150.

Upon receipt of LMR 160, MEP 154A obtains RxFCl value C1, the value of local receipt counter (RxFCl) $158A_2$ at the time of LMR receipt. MEP 154A thus has values for each of the remote counters for the service endpoint from MEP 155A and values for the local counters from the service endpoint as maintained by accounting module 156A. These values are TxFCf[tc], RxFCf[tc], TxFCb[tc], and RxFCl[tc], where tc is the reception time of LMR 160. Because MEPs 154A, 155A exchange LMM 160 and LMR 162 periodically, MEP 154A also stores counter values for a previous iteration. That is, MEP 154A has values for the remote and local counters for the service endpoint from the prior period. Specifically, MEP 154A stores TxFCf[tp], RxFCf[tp], TxFCb

[tp], and RxFCl[tp], where tp is the reception time by MEP 154A of the LMR prior to LMR 160.

MEP 154A computes unicast PDU loss between the MEPs based on the values for the local and remote counters. In example, MEP 154A computes unicast PDU loss according to techniques described in ITU-T Y.1731. That is, MEP 154A computes far-end PDU loss (i.e., PDU lost while traversing the service from PE router 150A to PE router 150B) as |TxFCf[tc]−TxFCf[tp]|−|RxFCf[tc]−RxFCf[tp]|. MEP 154A additionally computer near-end PDU loss (i.e., PDU lost while traversing the VPLS instance from PE router 150B to PE router 150A) as |TxFCb[tc]−TxFCb[tp]|−|RxFCl[tc]−RxFCl[tp]|.

CFM module 152A provides near-end and far-end PDU loss data computed by MEP 154A according to the described techniques to an administrative entity (e.g., a network management system) to, for example, validate a service-level agreement for a service implemented by PE routers 150. CFM module 152A may provide to the administrative entity the PDU loss data as a PDU loss ratio by dividing the PDU loss by the transmission counter difference. CFM module 152A may further provide the period over which PDU loss is computed, where the period may be calculated as T=(tc−tp).

Various embodiments of the invention have been described. These and other embodiments are within the scope of the following claims.

The invention claimed is:

1. A method comprising:
switching layer two (L2) packet data units (PDUs) with a local network device between a local L2 network, coupled by an attachment circuit for a Virtual Private Local Area Network (LAN) Service (VPLS) instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to one or more corresponding remote network devices that each serves at least one of the remote L2 networks; and
incrementing, with the local network device, a respective unicast receipt counter for each of one or more remote service endpoints of the VPLS instance only for the PDUs that are known unicast PDUs within the respective remote network device of the corresponding remote service endpoint from which the PDU was received, wherein each of the known unicast PDUs received by the local network device for the VPLS instance is a unicast PDU that includes an indicator that the remote network device from which the unicast PDU was received currently maps the destination L2 address of the unicast PDU to a corresponding outbound interface of the remote network device and selects only the corresponding outbound interface of the remote network device for forwarding the unicast PDU.

2. The method of claim 1, further comprising:
incrementing, with the local network device, a respective unicast transmit counter for each of one or more remote service endpoints of the VPLS instance only for the PDUs that are known unicast PDUs that the local network device sends to the corresponding remote service endpoints, wherein the known unicast PDUs sent by the local network device are unicast PDUs having destination L2 addresses currently mapped to a corresponding outbound interface of the local network device and for which the local network device selects only the corresponding outbound interface of the local network device for forwarding the unicast PDU;
determining, with the local network device, unicast PDU loss measurement data between a local service endpoint of the local network device for the VPLS instance and the one or more remote service endpoints based at least on the respective unicast transmit counter and unicast receipt counter values for the each of the one or more remote service endpoints; and
sending the unicast PDU loss measurement data from the local network device to a management entity.

3. The method of claim 2, further comprising:
receiving a first PDU with the local network device from the local L2 network;
determining whether the first PDU is a known unicast PDU within the local network device;
only when the first PDU is known unicast, attaching a shim header to the first PDU to mark the first PDU as known unicast and outputting the first PDU with the attached shim header over a core-facing pseudowire selected according to the VPLS instance.

4. The method of claim 3,
wherein determining whether the first PDU is a known unicast PDU within the local network device comprises determining whether a Media Access Control (MAC) table of the local network device maps a destination L2 address of the first PDU to an outbound interface of the local network device.

5. The method of claim 3,
wherein the shim header comprises a service endpoint identifier (SEID) that uniquely identifies the local service endpoint of the local network device.

6. The method of claim 5, further comprising:
incrementing, with the local network device, a unicast transmit counter for a remote SEID that uniquely identifies one of the remote service endpoints of the remote network device that serves the customer device having the destination L2 address of the first PDU only when the first PDU is known unicast.

7. The method of claim 3, further comprising:
receiving a second PDU with the local network device from a core-facing pseudowire; and
determining, with the local network device, the second PDU is known unicast within a remote network device that comprises an ingress one of the remote service endpoints for the second PDU.

8. The method of claim 7,
wherein determining, with the local network device, the second PDU is known unicast within the remote network device comprises determining the second PDU includes an attached shim header that marks the second PDU as known unicast within the remote network device.

9. The method of claim 8,
wherein the shim header comprises a remote service endpoint identifier (SEID) that uniquely identifies one of the remote service endpoints of the remote network device among a plurality of service endpoints for the VPLS instance, the method further comprising:
incrementing, with the local network device, a unicast receipt counter for the remote SEID only when the second PDU includes the shim header.

10. The method of claim 2, further comprising:
receiving, with the local network device, a remote unicast receipt counter value for the local service endpoint from a remote network device comprising a first one of the remote service endpoints, wherein the remote unicast receipt counter value is a number of known unicast PDUs received by the first one of the remote service endpoint from the local service endpoint; and receiving, with the local network device, a remote unicast transmit counter value for the local service endpoint from the remote network device, wherein the remote unicast transmit counter value is a number of known unicast PDUs transmitted by the first one of the remote service endpoints to the local service endpoint, wherein determining unicast PDU loss measurement data comprises computing a near-end unicast PDU loss between the local service endpoint and the first one of the remote service endpoints as a difference between the remote unicast transmit counter value and the unicast receipt counter value for the first one of the remote service endpoints, wherein determining unicast PDU loss measurement data comprises computing a far-end unicast PDU loss between the local service endpoint and the remote service endpoint as a difference between the remote unicast receipt counter value and a respective transmit counter value for the first one of the remote service endpoints, and wherein sending the unicast PDU loss measurement data from the local network device to the management entity comprises sending the near-end unicast PDU loss measurement data and the far-end unicast PDU loss measurement data.

11. The method of claim 10, further comprising:

receiving the remote unicast receipt counter value and the remote unicast transmit counter value with the local network device in a loss measurement reply (LMR) message generated in accordance with a Loss Measurement Message (LMM) protocol.

12. The method of claim 11, further comprising:

sending the unicast transmit counter value for the remote service endpoint from the local network device to the remote network device in a loss measurement message (LMM) generated in accordance with the LMM protocol.

13. A method comprising:

switching layer two (L2) packet data units (PDUs) with a local network device between a local L2 network, coupled by an attachment circuit for a Virtual Private Local Area Network (LAN) Service (VPLS) instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to one or more corresponding remote network devices that each serves at least one of the remote L2 networks;

incrementing, with the local network device, a multicast PDU transmit counter for each multicast PDU or broadcast PDU received from the attachment circuit and switched by the local network device to the one or more remote network devices;

receiving, with the local network device and from each remote network device of the one or more remote network devices, a multicast PDU receipt return value that defines a number of multicast or broadcast PDUs transmitted by the local network device and received by the remote network device;

determining, with the local network device, multicast PDU loss measurement data based at least on a multicast PDU transmit counter value and the multicast PDU receipt return values by accumulating the multicast PDU receipt return values to determine an accumulated value, dividing the accumulated value by a replication factor for the VPLS instance that defines a number of the one or more pseudowires terminated by the local network device to determine a quotient value, and determining the multicast PDU loss measurement data as a difference between the multicast PDU transmit counter value and the quotient value; and sending the multicast PDU loss measurement data from the local network device to a management entity.

14. A method comprising:

switching layer two (L2) packet data units (PDUs) with a local network device between a local L2 network, coupled by an attachment circuit for a Virtual Private Local Area Network (LAN) Service (VPLS) instance to the local network device, and one or more remote L2 networks to provide the VPLS instance to the local and remote L2 networks, wherein the local network device terminates one or more pseudowires that operate over a layer three (L3) packet-switched network (PSN) to carry the PDUs in pseudowire packets to connect, for the VPLS instance, the local network device to one or more corresponding remote network devices that each serves at least one of the remote L2 networks;

incrementing, with the local network device, a multicast PDU transmit counter for each multicast PDU or broadcast PDU received from the attachment circuit and switched by the local network device to the one or more remote network devices;

issuing a multicast loss measurement message from the local network device to the one or more remote network devices, wherein the multicast loss measurement message specifies a replication factor for the VPLS instance at the local network device that defines a number of the one or more pseudowires terminated by the local network device;

receiving, with the local network device and from each remote network device of the one or more remote network devices, a multicast PDU receipt return value that defines a value computed by the remote network device based at least on a number of the multicast or broadcast PDUs transmitted by the local network device and received by the remote network device and the replication factor;

determining, with the local network device, multicast PDU loss measurement data based at least on a multicast PDU transmit counter value and the multicast PDU receipt return values; and sending the multicast PDU loss measurement data from the local network device to a management entity.

15. The method of claim 14, wherein at least one of the remote network devices that participates in the VPLS instance is not a member of a loss measurement domain for the VPLS instance, wherein the multicast loss measurement message specifies a loss measurement domain identifier for the loss measurement domain, and wherein the replication factor for the VPLS instance at the local network device defines a number of the one or more pseudowires terminated by the local network device and by remote network devices of the one or more remote network devices that are members of the loss measurement domain.

16. A network device comprising:

a control unit having one or more processors;

one or more interface cards;

a Virtual Private Local Area Network (LAN) Service (VPLS) layer of the control unit that switches layer two (L2) packet data units (PDUs) between a local L2 network, coupled by an attachment circuit for a VPLS instance to one of the interface cards, and one or more remote L2 networks to provide the VPLS instance to the local and remote L2 networks, wherein the network device terminates one or more pseudowires that operate over a layer three (L3) packet-switched network (PSN) to carry the PDUs in pseudowire packets to connect, for the VPLS instance, the network device to one or more corresponding remote network devices that each serves at least one of the remote L2 networks; and an accounting module of the control unit that increments a respective unicast transmit counter for each of one or more remote service endpoints of the VPLS instance only for the PDUs that are known unicast PDUs within the VPLS layer that the network device sends to the corresponding remote service endpoints from which the PDU was received, wherein each of the known unicast PDUs received by the local network device for the VPLS instance is a unicast PDU that includes an indicator that the remote network device from which the unicast PDU was received currently maps the destination L2 address of the unicast PDU to a corresponding outbound interface of the remote network device and selects only the corresponding outbound interface of the remote network device for forwarding the unicast PDU.

17. The network device of claim 16,
wherein the accounting module increments a respective unicast receipt counter for each of one or more remote service endpoints of the VPLS instance only for the PDUs that are known unicast PDUs that the network device receives from the corresponding remote service endpoints that are known unicast PDUs within the respective remote network devices of the corresponding remote service endpoints, wherein the known unicast PDUs sent by the local network device are unicast PDUs having destination L2 addresses currently mapped to a corresponding outbound interface of the local network device and for which the local network device selects only the corresponding outbound interface of the local network device for forwarding the unicast PDU, the network device further comprising:
a loss measurement module of the control unit that determines unicast PDU loss measurement data between a local service endpoint of the network device for the VPLS instance and the one or more remote service endpoints based at least on the respective unicast transmit counter and unicast receipt counter values for the each of the one or more remote service endpoints; and
a management interface of the control unit that sends the unicast PDU loss measurement data to a management entity.

18. The network device of claim 17,
wherein the interface cards receive a first PDU from the local L2 network on the attachment circuit, the network device further comprising:
a loss measurement PDU handler of the control unit that determines whether the first PDU is a known unicast PDU and, only when the first PDU is known unicast, attaches a shim header to the first PDU to mark the first PDU as known unicast,
wherein the VPLS layer switches the first PDU with the attached shim header over a core-facing pseudowire selected according to the VPLS instance.

19. The network device of claim 18, further comprising:
a MAC table for the VPLS instance that maps learned L2 addresses of customer devices of the customer networks to interfaces of the network device,
wherein the loss measurement PDU handler determines whether the MAC table of the network device maps a destination L2 address of the first PDU to one of the interfaces of the network device.

20. The network device of claim 18,
wherein the shim header comprises a service endpoint identifier (SEID) that uniquely identifies the local service endpoint of the network device.

21. The network device of claim 20,
wherein the accounting module increments a unicast transmit counter for a remote SEID that uniquely identifies one of the remote service endpoints of the remote network device that serves the customer device having the destination L2 address of the first PDU only when the first PDU is known unicast.

22. The network device of claim 18,
wherein the interface cards receive a second PDU from a core-facing pseudowire, and
wherein the loss measurement PDU handler determines whether the second PDU is known unicast within a remote network device that comprises an ingress remote service endpoint for the second PDU.

23. The network device of claim 22,
wherein the loss measurement PDU handler determines the second PDU is known unicast within a remote network device by determining the second PDU includes an attached shim header that marks the second PDU as known unicast within the remote network device.

24. The network device of claim 23,
wherein the shim header comprises a remote service endpoint identifier (SEID) that uniquely identifies the ingress service endpoint of the remote network device among a plurality of service endpoints for the VPLS instance, and
wherein the accounting module increments a unicast receipt counter for the remote SEID only when the second PDU includes the shim header.

25. The network device of claim 17, further comprising:
a loss measurement message handler of the control unit that receives a remote unicast receipt counter value for the local service endpoint from a remote network device, wherein the remote unicast receipt counter value is a number of known unicast PDU received by the remote network device from the local service endpoint,
wherein the loss measurement message handler receives a remote unicast transmit counter value for the local service endpoint from the remote network device, wherein the remote unicast transmit counter value is a number of known unicast PDUs transmitted by the first one of the remote service endpoints to the local service endpoint,
wherein the loss measurement module determines unicast PDU loss measurement data by computing a near-end unicast PDU loss between the local service endpoint and the first one of the remote service endpoints as a difference between the remote unicast transmit counter value and the unicast receipt counter value for the first one of the remote service endpoints,
wherein the loss measurement module determines unicast PDU loss measurement data by computing a far-end unicast PDU loss between the local service endpoint and the remote service endpoint as a difference between the remote unicast receipt counter value and a respective transmit counter value for the first one of the remote service endpoints, and wherein the management interface sends the unicast PDU loss measurement data from the local network device to the management entity comprises sending the near-end unicast PDU loss measurement data and the far-end unicast PDU loss measurement data.

26. The network device of claim 25, further comprising:
a connectivity fault management module of the control unit that includes a maintenance entity endpoint (MEP),
wherein the MEP receives the remote unicast receipt counter value and the remote unicast transmit counter value in a loss measurement reply (LMR) message generated in accordance with a Loss Measurement Message (LMM) protocol.

27. The network device of claim 26,
wherein the MEP sends the transmit unicast counter value for the first one of the remote service endpoints to the remote network device in a loss measurement message (LMM) generated in accordance with the LMM protocol.

28. A network device comprising:
a control unit having one or more processors;
one or more interface cards;
a Virtual Private Local Area Network (LAN) Service (VPLS) layer of the control unit to switch layer two (L2) packet data units (PDUs) between a local L2 network, coupled by an attachment circuit for a VPLS instance to one of the interface cards, and one or more remote L2 networks to provide the VPLS instance to the local and remote L2 networks, wherein the network device terminates one or more pseudowires that operate over a layer three (L3) packet-switched network (PSN) to carry the PDUs in pseudowire packets to connect, for the VPLS instance, the network device to one or more corresponding remote network devices that each serves at least one of the remote L2 networks;
an accounting module of the control unit that increments a multicast PDU transmit counter for each multicast PDU or broadcast PDU received from the attachment circuit and switched by the VPLS layer to the one or more remote network devices;
a loss measurement message handler that receives, from each remote network device of the one or more remote network devices, a multicast PDU receipt return value that defines a number of multicast or broadcast PDUs transmitted by the local network device and received by the remote network device,
wherein the accounting module determines multicast PDU loss measurement data based at least on a multicast PDU transmit counter value and the respective multicast PDU receipt return values by accumulating the multicast PDU receipt return values to determine an accumulated value, dividing the accumulated value by a replication factor for the VPLS instance that defines a number of the one or more pseudowires terminated by the network device to determine a quotient value, and determining the multicast PDU loss measurement data as a difference between the multicast PDU transmit counter value and the quotient value; and
a management interface that sends the multicast PDU loss measurement data to a management entity.

29. A network device comprising:
a control unit having one or more processors;
one or more interface cards;
a Virtual Private Local Area Network (LAN) Service (VPLS) layer of the control unit to switch layer two (L2) packet data units (PDUs) between a local L2 network, coupled by an attachment circuit for a VPLS instance to one of the interface cards, and one or more remote L2 networks to provide the VPLS instance to the local and remote L2 networks, wherein the network device terminates one or more pseudowires that operate over a layer three (L3) packet-switched network (PSN) to carry the PDUs in pseudowire packets to connect, for the VPLS instance, the network device to one or more corresponding remote network devices that each serves a corresponding one of the remote L2 networks;
an accounting module of the control unit that increments a multicast PDU transmit counter for each multicast PDU or broadcast PDU received from the attachment circuit and switched by the VPLS layer to the one or more remote network devices;
a loss measurement message handler that issues a multicast loss measurement message to the one or more remote network devices, wherein the multicast loss measurement message specifies a replication factor for the VPLS instance that defines the number of the one or more pseudowires terminated by the network device,
wherein the loss measurement message handler receives, from each remote network device of the one or more remote network devices, a multicast PDU receipt return value that defines a value computed by the remote network device based at least on a number of the multicast or broadcast PDUs transmitted by the local network device and received by the remote network device and the replication factor,
wherein the accounting module determines multicast PDU loss measurement data based at least on a multicast PDU transmit counter value and the multicast PDU receipt return values; and
a management interface that sends the multicast PDU loss measurement data to a management entity.

30. The network device of claim 29,
wherein at least one of the remote network devices that participates in the VPLS instance is not a member of a loss measurement domain for the VPLS instance, and
wherein the multicast loss measurement message specifies a loss measurement domain identifier for the loss measurement domain, and wherein the replication factor for the VPLS instance defines the number of the one or more pseudowires terminated by the network device and by remote network devices of the one or more remote network devices that are members of the loss measurement domain.

31. A system comprising:
a network management system;
a local network device and one or more remote network devices that participate in a hierarchical Virtual Private Local Area Network (LAN) Service (H-VPLS) instance to switch layer two (L2) packet data units (PDUs) between a local L2 network, coupled by an attachment circuit for the H-VPLS instance to the local network device, and one or more remote L2 networks to provide the H-VPLS instance to the local and remote L2 networks, wherein the local network device terminates one or more pseudowires that operate over a layer three (L3) packet-switched network (PSN) to carry the PDUs in pseudowire packets to connect, for the H-VPLS instance, the local network device to the one or more corresponding remote network devices that each serves a corresponding one of the remote L2 networks
one or more hub routers interconnected by one or more hub links in a hub for the H-VPLS instance, wherein each of the one or more hub routers is connected to one or more of the remote network devices or the local network device with a respective spoke pseudowire, wherein the local network device increments a multicast PDU transmit counter for each multicast PDU or broadcast PDU received from the attachment circuit and switched by the local network device to the one or more remote network devices, wherein each of the one or more remote network devices increment a respective multicast PDU receipt counter for the local network device for each multicast PDU or broadcast PDU received from the local network device, wherein the local network device issues a multicast loss measurement message from the local network device to the one or more remote network devices, wherein an entrance one of the hub routers receives the multicast loss measurement message issued by the local network device and adds an entrance replication factor to the multicast loss measurement message that specifies a number hub pseudowires for the H-VPLS instance terminated by the entrance one of the hub routers, wherein one or more exit ones of the hub routers each receive a replicated, modified multicast loss measurement message from the entrance one of the hub routers and each add a respective exit replication factor to the multicast loss measurement message that specifies a respective number of spoke pseudowires for the H-VPLS terminated by the exit one of the hub routers, wherein each remote network device of the one or more remote network devices receives a replicated, modified multicast loss measurement message via a spoke pseudowire from one of the exit one of the hub routers and computes a return value as a quotient of the multicast PDU receipt counter value of remote network device for the local network device and a product of the entrance replication factor and the exit replication factor included in the respective replicated, modified multicast loss measurement message, and sends the return value to the local network device, wherein the local network device receives the return values from the one or more remote network devices and computes multicast PDU loss measurement data based at least on the return values and a multicast PDU transmit counter value, and wherein the local network device sends the multicast PDU loss measurement data to the network management system.

32. The system of claim 31, wherein the multicast loss measurement message issued by the local network device specifies a replication factor for the VPLS instance that defines a number of the one or more pseudowires terminated by the local network device, and wherein the one or more remote network devices compute respective return values based at least on the replication factor.

33. The system of claim 32, wherein the one or more remote network devices compute respective return values by computing a quotient of the respective multicast PDU receipt counter value for the local network device and the replication factor.

34. The system of claim 31, wherein each of the one or more hub routers includes a replication factor table that maps an exit replication factor and/or an entrance replication factor to a loss measurement domain identifier that identifies a loss measurement domain for the H-VPLS instance, wherein the local network devices issues the multicast loss measurement message that specifies the loss measurement domain identifier, wherein the entrance one of the hub routers adds the entrance replication factor mapped to the loss measurement domain identifier in the replication factor table, and wherein the one or more exit ones of the hub routers add the exit replication factor mapped to the loss measurement domain identifier in the replication factor table.

* * * * *